United States Patent
Sato

(10) Patent No.: US 9,811,816 B2
(45) Date of Patent: Nov. 7, 2017

(54) COMMODITY IDENTIFICATION DEVICE AND COMMODITY RECOGNITION NAVIGATION METHOD

(71) Applicant: CASIO COMPUTER CO., LTD., Shibuya-ku, Tokyo (JP)

(72) Inventor: Yoshihiro Sato, Asaka (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 73 days.

(21) Appl. No.: 14/924,387

(22) Filed: Oct. 27, 2015

(65) Prior Publication Data

US 2016/0180509 A1    Jun. 23, 2016

(30) Foreign Application Priority Data

Dec. 17, 2014 (JP) ................................ 2014-255539

(51) Int. Cl.
*G06K 9/00* (2006.01)
*G06Q 20/20* (2012.01)
*A47F 9/04* (2006.01)

(52) U.S. Cl.
CPC ............. *G06Q 20/208* (2013.01); *G06K 9/00* (2013.01); *A47F 9/047* (2013.01); *G06K 2209/17* (2013.01)

(58) Field of Classification Search
CPC ....... G06Q 20/208; G06K 9/46; G06K 9/3241
See application file for complete search history.

(56) References Cited

U.S. PATENT DOCUMENTS

| 8,255,291 | B1* | 8/2012 | Nair | G06F 17/30864 705/26.64 |
| 9,076,177 | B2 | 7/2015 | Gotanda | |
| 2004/0189829 | A1* | 9/2004 | Fukuda | H04N 5/23222 348/239 |
| 2009/0171798 | A1* | 7/2009 | Sasaki | G06Q 20/204 705/17 |
| 2010/0107121 | A1* | 4/2010 | Kawachi | B60N 2/0244 715/823 |
| 2010/0201784 | A1* | 8/2010 | Lippert | G02B 21/002 348/46 |
| 2012/0047038 | A1* | 2/2012 | Sano | G06Q 20/20 705/23 |

(Continued)

FOREIGN PATENT DOCUMENTS

JP    2013182323 A    9/2013
JP    2013210971 A    10/2013
JP    2014160514 A    9/2014

Primary Examiner — Stephen R Koziol
Assistant Examiner — Shaghayegh Azima
(74) Attorney, Agent, or Firm — Holtz, Holtz & Volek PC

(57) ABSTRACT

To enable registration of a commodity without interrupting the flow of sales registration by an operator, a commodity identification device 2 specifically includes: a camera 27 that takes an image of an object that an operator holds over the camera; and a CPU 211 that is configured to, when the object is recognized from an image taken by the camera 27 and the object recognized is compared with reference images of each commodity in plurality of directions, and when the object is similar to a plurality of commodities, specify reference images having a noticeable difference, and guide the operator to rotate the object so that the object in the direction corresponding to the specified reference images is directed toward the camera 27.

10 Claims, 18 Drawing Sheets

(56) References Cited

U.S. PATENT DOCUMENTS

| | | | |
|---|---|---|---|
| 2012/0099012 A1* | 4/2012 | Ryu | H04N 5/23293 348/333.01 |
| 2013/0141585 A1* | 6/2013 | Naito | G06Q 20/208 348/150 |
| 2013/0252211 A1* | 9/2013 | Oshima | G01G 19/50 434/127 |
| 2014/0278742 A1* | 9/2014 | MacMillan | G06Q 30/0201 705/7.29 |
| 2015/0012387 A1* | 1/2015 | Katagiri | G06Q 30/02 705/26.64 |
| 2015/0117752 A1* | 4/2015 | Ueno | G06T 11/00 382/141 |
| 2015/0121523 A1* | 4/2015 | Crowley | G06Q 10/06 726/23 |
| 2015/0121528 A1* | 4/2015 | Crowley | H04L 63/1441 726/23 |
| 2015/0139493 A1* | 5/2015 | Takeno | G06K 9/00912 382/103 |
| 2016/0180509 A1* | 6/2016 | Sato | G06Q 20/208 382/103 |

* cited by examiner

FIG. 5

| | | | | | |
|---|---|---|---|---|---|
| 361a | 361b | 361c | 361d | 361e | 361f |

361

| FEATURE AMOUNT | IMAGE LINK | DIRECTION | COMMODITY ID | UNIT PRICE | COMMODITY NAME |
|---|---|---|---|---|---|
| (STUFFED RABBIT FRONT FEATURE AMOUNT) | N0001F.jpg | (0,0,1) | N0001 | 800 | RABBIT・STUFFED TOY |
| (STUFFED RABBIT BACK FEATURE AMOUNT) | N0001B.jpg | (0,0,-1) | N0001 | 800 | RABBIT・STUFFED TOY |
| (STUFFED RABBIT TOP FEATURE AMOUNT) | N0001T.jpg | (0,1,0) | N0001 | 800 | RABBIT・STUFFED TOY |
| (STUFFED RABBIT BOTTOM FEATURE AMOUNT) | N0001U.jpg | (0,-1,0) | N0001 | 800 | RABBIT・STUFFED TOY |
| (STUFFED RABBIT RIGHT FEATURE AMOUNT) | N0001R.jpg | (1,0,0) | N0001 | 800 | RABBIT・STUFFED TOY |
| (STUFFED RABBIT LEFT FEATURE AMOUNT) | N0001L.jpg | (-1,0,0) | N0001 | 800 | RABBIT・STUFFED TOY |
| (STUFFED BEAR FRONT FEATURE AMOUNT) | N0002F.jpg | (0,0,1) | N0002 | 1200 | BEAR・STUFFED TOY |
| (STUFFED BEAR BACK FEATURE AMOUNT) | N0002B.jpg | (0,0,-1) | N0002 | 1200 | BEAR・STUFFED TOY |
| (STUFFED BEAR TOP FEATURE AMOUNT) | N0002T.jpg | (0,1,0) | N0002 | 1200 | BEAR・STUFFED TOY |
| (STUFFED BEAR BOTTOM FEATURE AMOUNT) | N0002U.jpg | (0,-1,0) | N0002 | 1200 | BEAR・STUFFED TOY |
| (STUFFED BEAR RIGHT FEATURE AMOUNT) | N0002R.jpg | (1,0,0) | N0002 | 1200 | BEAR・STUFFED TOY |
| (STUFFED BEAR LEFT FEATURE AMOUNT) | N0002L.jpg | (-1,0,0) | N0002 | 1200 | BEAR・STUFFED TOY |
| . . . | . . . | . . . | . . . | . . . | . . . |

FIG. 8

| COMMODITY ID #1 362a | DIRECTION #1 362b | COMMODITY ID #2 362c | DIRECTION #2 362d | FEATURE IMAGE 362e | FEATURE DIRECTION 362f | ROTATING AXIS VECTOR 362g |
|---|---|---|---|---|---|---|
| N0001 | (0,-1,0) | N0002 | (0,-1,0) | N0001F.jpg | (0,0,1) | (-1,0,0) |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

| COMMODITY ID #1 | DIRECTION #1 | COMMODITY ID #2 | DIRECTION #2 | FEATURE IMAGE |
|---|---|---|---|---|
| N0002 | (0,-1,0) | N0001 | (0,-1,0) | N0002F.jpg |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |

| | 361a | 361b | 361c | 361d | 361e | 361f | 361g |
|---|---|---|---|---|---|---|---|
| | FEATURE AMOUNT | IMAGE LINK | CLASS | COMMODITY ID | UNIT PRICE | COMMODITY NAME | REFERENCE FOR GUIDANCE |
| | (STUFFED RABBIT FRONT FEATURE AMOUNT) | N0001F.jpg | REFERENCE | N0001 | 800 | RABBIT·STUFFED TOY | N0001B.jpg |
| | (STUFFED RABBIT BACK FEATURE AMOUNT) | N0001B.jpg | FOR EXTRACTION | N0001 | 800 | RABBIT·STUFFED TOY | N0001SP.jpg |
| | (STUFFED RABBIT FEATURE AMOUNT OF HIGH-FEATURE REGION) | N0001SP.jpg | AUXILIARY | N0001 | 800 | RABBIT·STUFFED TOY | — |
| | (STUFFED BEAR FRONT FEATURE AMOUNT) | N0002F.jpg | REFERENCE | N0002 | 1200 | BEAR·STUFFED TOY | N0002B.jpg |
| | (STUFFED BEAR BACK FEATURE AMOUNT) | N0002B.jpg | FOR EXTRACTION | N0002 | 1200 | BEAR·STUFFED TOY | N0002SP.jpg |
| | (STUFFED BEAR FEATURE AMOUNT OF HIGH-FEATURE REGION) | N0002SP.jpg | AUXILIARY | N0002 | 1200 | BEAR·STUFFED TOY | — |
| | ... | ... | ... | ... | ... | ... | ... |

N0001F.jpg (REFERENCE IMAGE)
FRONT

N0001B.jpg (IMAGE FOR EXTRACTION)
BACK

SP1
HIGH-FEATURE REGION

N0001SP.jpg (AUXILIARY IMAGE)

N0002F.jpg (REFERENCE IMAGE)
FRONT

N0002B.jpg (IMAGE FOR EXTRACTION)
BACK

SP2
HIGH-FEATURE REGION

N0002SP.jpg (AUXILIARY IMAGE)

COMMODITY IDENTIFICATION DEVICE AND COMMODITY RECOGNITION NAVIGATION METHOD

BACKGROUND OF THE INVENTION

Field of the Invention

The present invention relates to a commodity identification device to recognize a commodity for sales registration and a commodity recognition navigation method.

Background Art

A conventional electronic cash register (commodity registration device) is configured to read a data code, such as a barcode, attached to a commodity by a barcode reader to recognize the commodity. Such a barcode attached to a commodity contains information on a manufacturer code, information on an item code and information on check digits. The commodity registration device confirms correct reading of the barcode in accordance with the information on check digits, and then recognizes the commodity based on the information on the item code. A barcode is printed beforehand on wrapping of a commodity, for example, which can reduce the burden on an operator of the cash register.

However, it is very troublesome to attach a barcode to a commodity that is not wrapped, e.g., fruits and vegetables, which consumes time and cost. In a conventional operation, an operator pushes a button indicating a commodity, such as fruits and vegetables, touches a screen, or selects the code of the commodity from a barcode list separately prepared and reads it with a scanner.

Recently a commodity registration device configured to perform object recognition of fruits and vegetables, for example, and sales registration of the recognized commodity is being introduced widely. This type of commodity registration device is configured to extract an appearance feature amount from image information of a taken image of an object, such as fruits and vegetables, and compares it with a feature amount database about the appearance of commodities to recognize the object as one commodity. Such a commodity registration device can recognize a commodity that is not wrapped as well without the necessity of attaching a barcode thereto, and so the burden on the store can be reduced.

Commodities have a difference in appearance individually. If a commodity as a target is greatly different in appearance from a commodity as a reference, it is difficult to uniquely identify this target commodity based on a similarity degree obtained from the object recognition being performed. In such a case, a conventional commodity registration device having an object recognition function displays a confirmation screen showing a temporary-identified commodity as a candidate of this target commodity, or displays a screen showing a plurality of commodities as candidates of the target commodity in a selectable manner. The operator is then required to perform an operation to touch the screen at a part of the corresponding commodity among the selectable options, for example.

For instance, according to the Patent Document 1 (JP 2013-182323 A), illustration images G1, G2 and G3 of registered commodities as commodity candidates and their commodity names are displayed at a commodity candidate presentation region 83 in the descending order of the similarity degree. The region is configured so that these illustration images G1, G2 and G3 can be selected in accordance with a selection operation to a touch panel 105. At a lower part of the commodity candidate presentation region 83, a selection button 84 to select a commodity from a commodity list is provided, and a commodity selected from the commodity list is processed as a temporary-identified commodity as stated above.

When a customer purchases commodities at a supermarket, they put the commodities in a shopping basket or the like and pass the shopping basket to an operator (store staff) at a cash register to ask the operator for checkout of the commodities. At this time, the operator repeats the operation to make a commodity registration device read the commodities one by one in the shopping basket (hereinafter called a "first shopping basket") that the customer brought for temporary-registration of commodity information on the commodities as sales information, and to put the commodities in another shopping basket (hereinafter called a "second basket"), whereby the commodities in the first shopping basket are sales-registered.

At this time, the commodity registration device fails to recognize a commodity promptly in some cases. For instance, if an image of a barcode part of a commodity with a barcode cannot be taken successfully, the commodity registration device fails to recognize the commodity promptly. In this case, the operator brings the commodity as close as possible to the camera of the commodity registration device, so as to allow the commodity registration device to recognize the commodity.

Meanwhile, when an image of a commodity as a target of object recognition cannot be taken at an appropriate angle, the commodity registration device cannot recognize the commodity promptly. In this case, the operator may erroneously bring the commodity as close as possible to the camera of the commodity registration device in a similar manner to the reading operation of a barcode.

The failure of a commodity identification device to perform object recognition of a commodity, however, often is caused by inappropriate orientation of the commodity presented toward a camera. For instance, although a commodity assumes a front direction as the orientation having a lot of feature amount enabling the identification of the commodity, the operator directs the top of the commodity toward the camera. Conversely although the orientation of a commodity having a lot of feature amount is a top direction, the operator directs the front of the commodity toward the camera, and these are main factors of the failure. In such a case, the commodity registration device presents a plurality of candidates among registered commodities.

When there is a plurality of candidates among the registered commodities, the invention described in Patent Document 1 sets one candidate among the registered commodities that is selected through a touch panel operation as a temporary-identified commodity. Such selection of the candidate commodity, however, interrupts the flow of sales registration by the operator. This is a factor to need time and labor by the operator, and further cause waiting time for a customer.

SUMMARY OF THE INVENTION

The present invention firstly aims to recognize a commodity without interrupting the flow of sales registration by an operator.

The present invention secondly aims to improve the precision to narrow down the commodity candidates.

To fulfill the above first aim, a first aspect of the present invention relates to a commodity identification device including: an imaging unit that takes an image of an object that an operator holds over the imaging unit; a detection unit that detects the object from an image taken by the imaging unit; a determination unit that compares the object detected by the detection unit with reference images of each commodity in plurality of directions to determine a similarity degree therebetween; and a guidance unit that, when the object is similar to a plurality of commodities, compares reference images of the plurality of commodities in the directions to specify reference images having a noticeable difference, and guides the operator to move the object so that the object in the direction corresponding to the specified reference images is directed toward the imaging unit.

To fulfill the above second aim, a second aspect of the present invention relates to a commodity identification device, including: a storage unit that stores a reference image representing appearance of each of carried commodities and auxiliary information indicating a feature part of the carried commodity; an imaging unit that takes an image of an object that an operator holds over the imaging unit to acquire a captured image of the object; a detection unit that detects the object from a captured image taken by the imaging unit; a narrowing-down unit that narrows down candidates for a target commodity of transaction based on a similarity degree between the object detected by the detection unit and the reference image of each carried commodity; and a guidance unit that, when the narrowing-down unit narrows down the candidates for the target commodity under a predetermined condition, guides the operator to direct a feature part of the object toward the imaging unit based on auxiliary information corresponding to the narrowed-down candidates.

According to the present invention, a commodity can be recognized without interrupting the flow of sales registration by the operator.

According to the present invention, the precision to narrow down candidates for a target commodity of transaction can be improved.

BRIEF DESCRIPTION OF THE DRAWING

FIG. 5 illustrates the configuration of a feature amount file in Embodiment 1.

FIG. 8 illustrates the configuration of a similar commodity database in Embodiment 1.

FIG. 11 illustrates the configuration of a similar commodity database in Embodiment 2.

FIG. 14 illustrates the configuration of a feature amount file used in Embodiment 3.

DETAILED DESCRIPTION OF THE PREFERRED EMBODIMENTS

Figure 1:
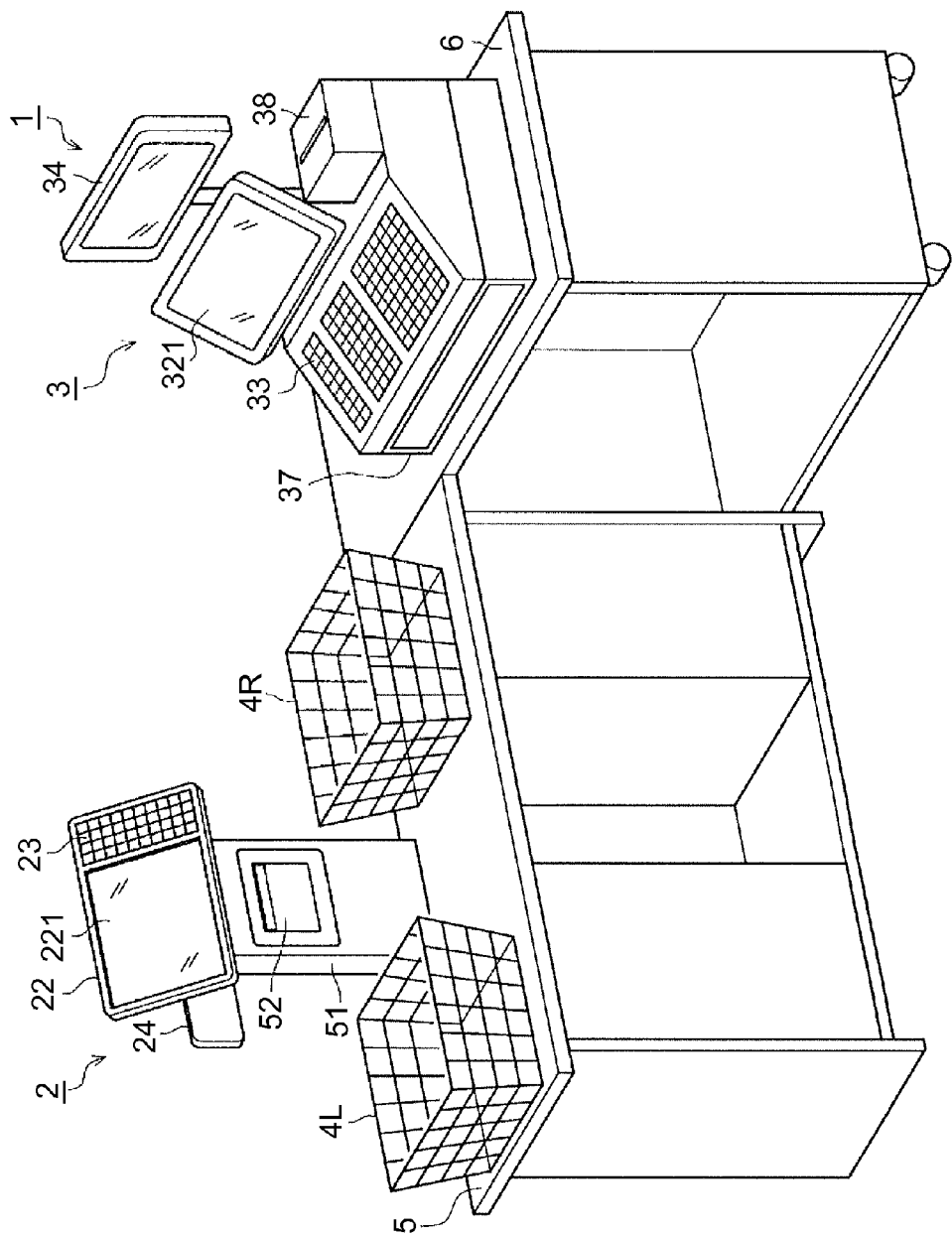
FIG. 1 is a perspective view showing the appearance of a commodity identification device or the like in one embodiment.

Referring to the drawings, the following describes embodiments of the present invention in details.

Basic Configuration of Embodiment

FIG. 1 is a perspective view showing the appearance of a commodity identification device 2 or the like in one embodiment.

As illustrated in FIG. 1, a commodity registration device 1 includes the commodity identification device 2 to register commodities and a POS terminal 3 to perform sales registration and checkout of the commodities for each transaction. This commodity identification device 2 is a POS connected scanner that is configured to read information on commodities for registration.

The commodity identification device 2 is disposed at a center of a counter base 5 like a horizontally-long table in the longitudinal direction. The commodity identification device 2 includes a thin and rectangular-parallelepiped housing 51. At the front of this housing 51, a camera 27 (see FIG. 2) is disposed via a reading window 52.

A display/manipulation unit 22 is attached above the housing 51. The display/manipulation unit 22 is provided with a display 221. On the surface of this display 221, a touch panel 222 (see FIG. 2) is stacked. On the right of the display 221, a keyboard 23 is disposed. On the right of the keyboard 23, a card reading groove of a card reader not illustrated is provided. On the left of and behind the display/manipulation unit 22, a display for customer 24 is provided facing the rear face toward the operator so as to offer information to a customer.

The POS terminal 3 is placed on a top face of a drawer 37 on a checkout table 6. This drawer 37 is controlled by the POS terminal 3 to open.

The POS terminal 3 has a top face, on which a keyboard 33 is provided for the manipulation of the operator (store staff). Above and behind the keyboard 33 from the operator, a display 321 to display information is provided. On the surface of this display 321, a touch panel 322 (see FIG. 2) is stacked. Further behind this display 321, a display for customer 34 to display information is provided so as to be rotatable in the horizontal direction. In FIG. 1, this display for customer 34 faces the viewer of the drawing. This display for customer 34 is rotated so as to face away from the viewer of the drawing, whereby it can display information to the customer.

The counter base 5 like a horizontally-long table is disposed so as to form a letter L shape with the checkout table 6 on which the POS terminal 3 is placed. On the top face of the counter base 5, a commodity-reception face is formed. A customer then gets the registration processing of the commodities while moving from left to right in FIG. 1. That is, on the commodity-reception face of the counter base 5, a first shopping basket 4L and a second shopping basket 4R to store commodities are placed. In the following descriptions, when the first shopping basket 4L and the second shopping basket 4R are not distinguished particularly, they may be described a shopping basket 4 simply. These shopping baskets 4 are not limited to a so-called basket shape, which may be a tray, for example. The shopping baskets 4 are not limited to a so-called basket shape, which may be a box or a bag, for example.

The first shopping basket 4L is brought by a customer, in which commodities for one transaction are stored. The second shopping basket 4R is placed at a position across the commodity identification device 2 from the first shopping basket 4L. The commodities in the first shopping basket 4L are picked up by the operator operating the commodity identification device 2 and are moved into the second shopping basket 4R. During this moving, the commodities are held over the reading window 52 of the commodity identification device 2. At this time, the camera 27 (see FIG. 2) disposed in the reading window 52 takes an image of the commodities.

The commodity identification device 2 recognizes to which one of the commodities recorded in a feature amount file 361 (see FIG. 2) described later the commodity included in the image taken by the camera 27 corresponds, and displays the result on the display 221. The commodity identification device 2 then informs the POS terminal 3 of the commodity ID of the recognized commodity. Based on the commodity ID received from the commodity identification device 2, the POS terminal 3 records information relating to sales registration of the commodity corresponding to the commodity ID, such as a commodity class, a commodity name, and a unit price, in a sales master file (not illustrated) for sales registration.

The present invention may be applied to a self-checkout machine to allow a customer to manipulate a cash register like an operator, and is not limited in this respect.

Figure 2:
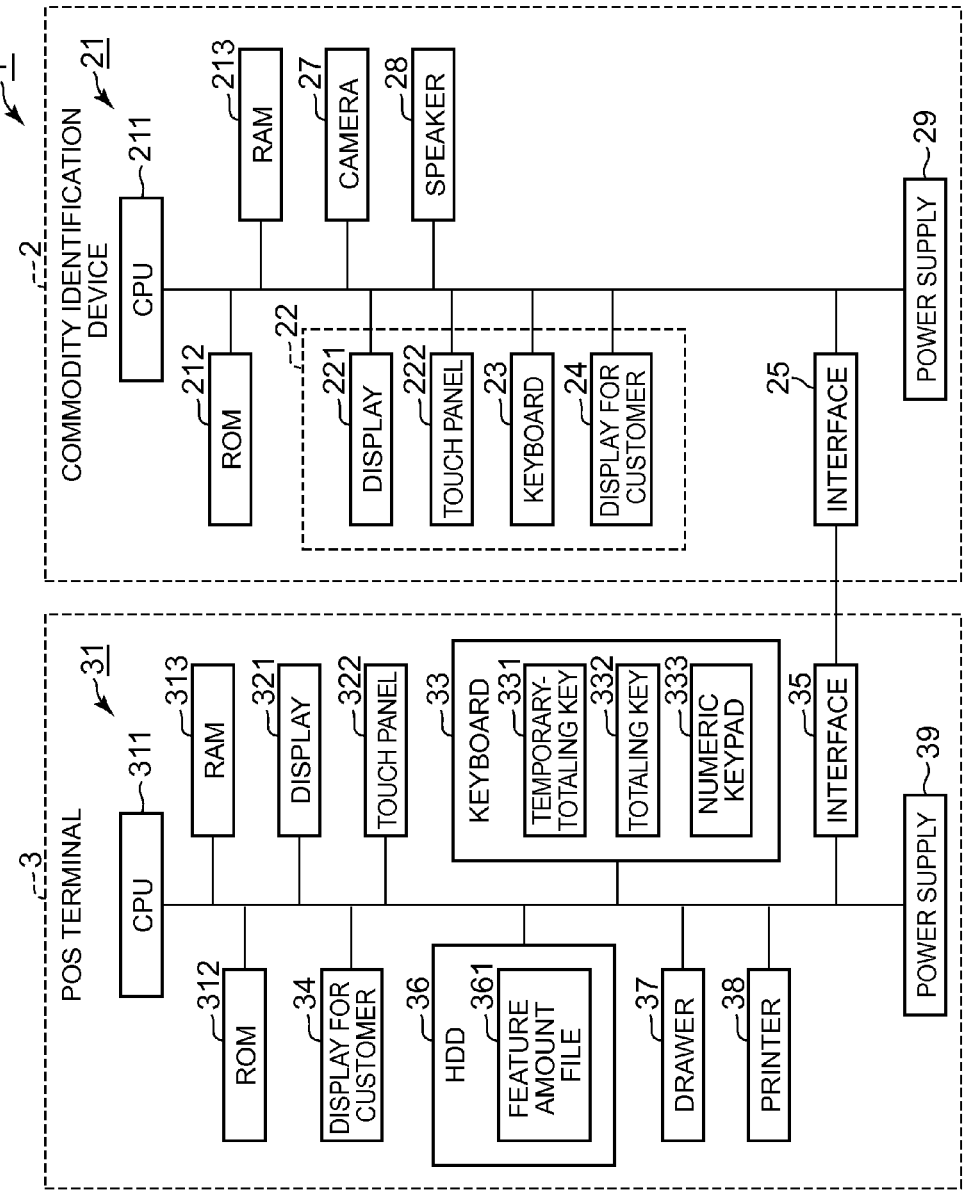
FIG. 2 schematically illustrates the configuration of the commodity identification device or the like in one embodiment.

FIG. 2 schematically illustrates the configuration of the commodity identification device 2 or the like in one embodiment.

The commodity registration device 1 includes the commodity identification device 2 and the POS terminal 3.

The commodity identification device 2 includes a microcomputer 21, the display/manipulation unit 22, an interface 25, the camera 27, a speaker 28 and a power supply 29.

The microcomputer 21 is control means made up of a CPU (Central Processing Unit) 211, a ROM (Read Only Memory) 212 and a RAM (Random Access Memory) 213 that are connected via a bus. The ROM 212 stores a program that is to be executed by the CPU 211.

The CPU 211 is connected to the display/manipulation unit 22, the interface 25, the camera 27, and the speaker 28 via an internal bus or various input/output circuits (not illustrated).

The display/manipulation unit 22 includes the display 221 (see FIG. 1), the touch panel 222, the display for customer 24 and the keyboard 23, and the operation is controlled by the CPU 211.

The display 221 is display means to display information to the operator in accordance with an instruction by the CPU 211. The touch panel 222 receives an input of the operation about information displayed on the display 221. The display for customer 24 displays information to the customer in accordance with an instruction by the CPU 211.

The keyboard 23 includes a plurality of manipulation keys, and receives an input through manipulation by the operator.

The interface 25 is connected to an interface 35 of the POS terminal 3 to enable data exchange with the POS terminal 3.

The camera 27 may be a color CCD image sensor or a color CMOS image sensor, for example, which is imaging means to take an image through the reading window 52 (see FIG. 1) under the control of the CPU 211. The camera 27 takes a moving image of 30 [fps], for example. Frame images (captured image) taken by the camera 27 successively at a predetermined frame rate are stored in the RAM 213.

The speaker 28 generates preset alarm sound or the like. The speaker 28 generates alarm sound or sends a notice by sound under the control of the CPU 211.

The power supply 29 supplies electricity to various parts of this commodity identification device 2.

The POS terminal 3 includes a microcomputer 31, the display 321, the touch panel 322, the keyboard 33, the display for customer 34, the interface 35, an HDD 36, the drawer 37, a printer 38 and a power supply 39.

The microcomputer 31 executes information processing. This microcomputer 31 is made up of a CPU 311 to execute various calculations and control various parts, to which a ROM 312 and a RAM 313 are connected via a bus. The CPU 311 is connected to the drawer 37, the keyboard 33, the display 321, the touch panel 322, the display for customer 34 and the HDD (Hard Disk Drive) 36 via an internal bus or various input/output circuits. They are controlled by the CPU 311.

The display 321 displays information to the operator in accordance with an instruction by the CPU 311. The touch panel 322 receives an input of the operation about information displayed on the display 321. The display for customer 34 displays information to the customer in accordance with an instruction by the CPU 311.

The keyboard 33 includes a temporary-totaling key 331, a totaling key 332, and a numeric keypad 333, and receives an input through manipulation by the operator. The numeric keypad 333 includes numeric keys from 0 to 9 and various mathematical operator keys.

The HDD 36 is storage means to store programs and various files. All or a part of the programs and various files stored in the HDD 36 is copied to the RAM 313 at the booting of the POS terminal 3, and then is executed by the CPU 311. The HDD 36 stores the feature amount file 361 and a similar commodity database 362, for example, and may store a program for commodity sales data processing. The feature amount file 361 is a commodity file containing information about each of commodities carried at the store that are to be displayed and sold, the information containing association of information on sales registration of a commodity and a taken image of the commodity from a plurality of directions, and functions as a dictionary of the carried commodities.

The interface 35 is connected to the commodity identification device 2 and enables data exchange with the commodity identification device 2.

The printer 38 prints data on a receipt or the like. In the POS terminal 3, the details of each transaction are printed on a receipt under the control of the CPU 311.

The power supply 39 supplies electricity to various parts of this POS terminal 3.

Figure 3:
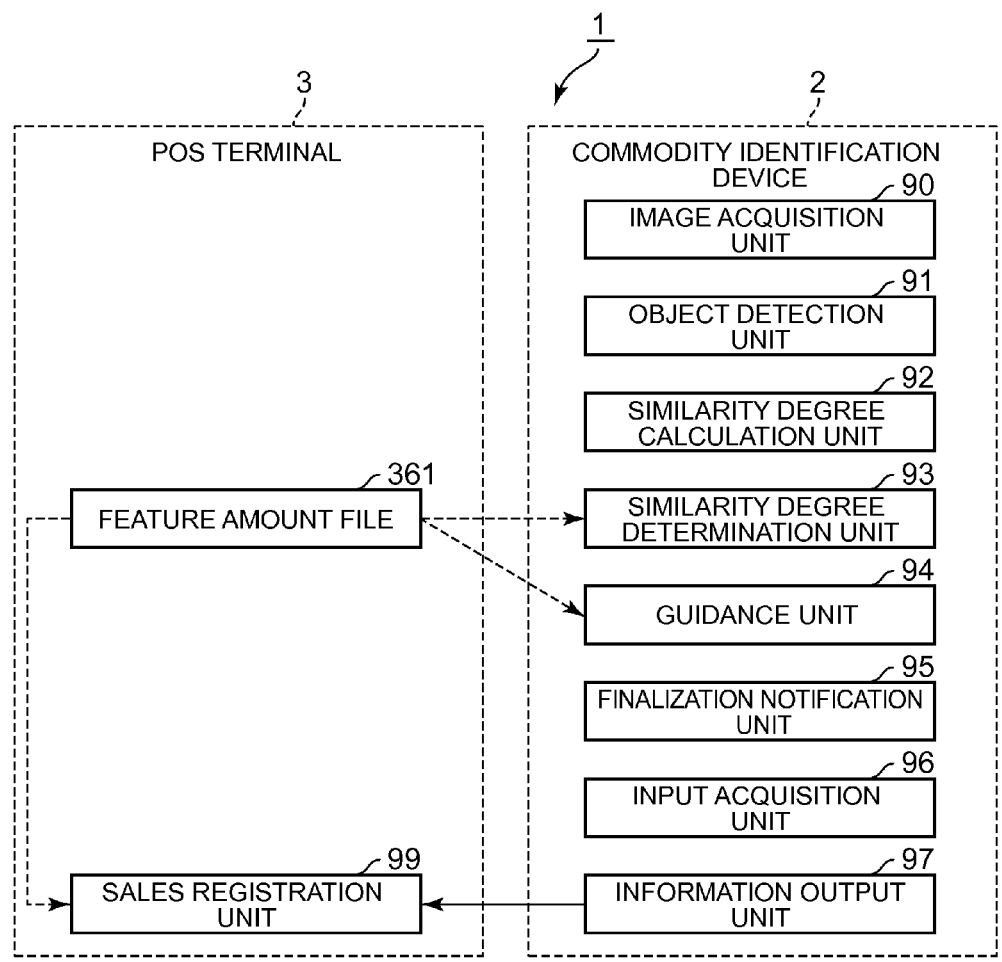
FIG. 3 is a functional block diagram schematically illustrating the commodity identification device or the like in one embodiment.

FIG. 3 is a functional block diagram schematically illustrating the commodity identification device 2 or the like in one embodiment. The following descriptions refer to FIG. 1 and FIG. 2 as well, as needed.

The CPU 211 of the commodity identification device 2 executes a program stored in the ROM 212 to implement the functions of an image acquisition unit 90, an object detection unit 91, a similarity degree calculation unit 92, a similarity degree determination unit 93, a guidance unit 94, a finalization notification unit 95, an input acquisition unit 96 and an information output unit 97. Similarly, the CPU 311 of the POS terminal 3 executes a program stored in the HDD 36 to implement the function of a sales registration unit 99. The HDD 36 of the POS terminal 3 stores the feature amount file 361 and the similar commodity database 362 as well.

The image acquisition unit 90 outputs an imaging ON signal to the camera 27 to let the camera 27 start an imaging operation. Further the image acquisition unit 90 acquires frame images taken by the camera 27 and stored in the RAM 213 one by one. Acquisition of frame images by the image acquisition unit 90 is performed in the storing order in the RAM 213.

The object detection unit 91 detects the entire or a part of an object included in a frame image acquired by the image acquisition unit 90 using a pattern matching technique, for example.

Specifically when the operator directs a commodity toward the reading window 52 for sales registration, the image acquisition unit 90 takes an image of this commodity by the camera 27. The object detection unit 91 then binarizes the frame image acquired to extract the outline. Next the object detection unit 91 compares the outline extracted from the previous frame image with the outline extracted from the frame image this time to detect (recognize) the object as this commodity.

The following describes another specific method. When the operator holds a commodity and directs it toward the reading window 52 for sales registration, the image acquisition unit 90 takes an image of the commodity and the hand by the camera 27. The object detection unit 91 then detects the presence or not of a skin color region from frame images acquired. When a skin color region is detected, i.e., when the hand of the operator is detected, the object detection unit 91 detects the outline in the vicinity of this skin color region. Thereby, the outline of the commodity that can be considered to be held by the operator's hand is extracted. When the outline of the hand shape is detected and the outline of the object at other part in the vicinity of the outline of the hand is further detected, the object detection unit 91 detects the commodity from the outline of this object.

The similarity degree calculation unit 92 reads the state of the surface of the commodity, such as color and irregularities at the surface, as a feature amount from the image of the commodity taken by the camera 27. The similarity degree calculation unit 92 does not consider the outline or the size of this commodity. Thereby, the similarity degree calculation unit 92 can shorten the processing time.

The similarity degree calculation unit 92 further reads, from a commodity image of each commodity (hereinafter called a carried commodity) recorded in the feature amount file 361, the state of a surface of the carried commodity, such as color or irregularities at the surface, as a feature amount and compares it with the feature amount of the taken image of the commodity, and calculates a similarity degree between the taken image of the commodity and the carried commodity recorded in the feature amount file 361. Herein, a similarity degree indicates how the entire or a part of the image of the commodity is similar to the commodity in the feature amount file 361 let that the commodity assumed in the file has a 100% similarity degree. The similarity degree calculation unit 92 may calculate a similarity degree while changing the weighting between color and irregularities at the surface.

Such recognition of an object included in an image is called generic object recognition. According to Keiji YANAI "The current state and future directions on generic object recognition", the current state of generic object recognition is surveyed in terms of datasets and evaluation benchmarks as well as the methods, and its future directions also are discussed.

Keiji Yanai "The current state and future directions on generic object recognition", [online], Journal of Information Processing Society, Nov. 15, 2007, Vol. 48, No. SIG 16, pp 1 to 24, [Search on Sep. 8, 2014 (Heisei 26)], Internet <URL: http://mm.cs.uec.ac.jp/IPSJ-TCVIM-Yanai.pdf>

The following document also describes a technique to perform generic object recognition by performing an area-division of an image for each object.

Jamie Shotton et al., "Semantic Texton Forests for Image Categorization and Segmentation", Computer Vision and Pattern Recognition, 2008. CVPR 2008. IEEE Conference on, [Search on Sep. 8, 2014 (Heisei 26)], Internet <URL: http://citeseerx.ist.psu.edu/viewdoc/download?doi=10.1.1.145.3036&rep=rep1&type=pdf>

Note here that a method for calculating a similarity degree between a taken image of the commodity and a commodity image of a carried commodity recorded in the feature amount file 361 is not limited especially. For instance, a similarity degree between a taken image of the commodity and a carried commodity recorded in the feature amount file 361 may be calculated as absolute evaluation or as relative evaluation.

When a similarity degree is calculated as absolute evaluation, a taken image of the commodity and each carried commodity recorded in the feature amount file 361 are compared to have a one to one correspondence, and a similarity degree derived from the comparison result is used as it is. When a similarity degree is calculated as relative evaluation, calculation is performed so that the total sum of the similarity degrees with various carried commodities becomes 1.0 (100%). For instance, assume that four commodities #1 to #4 are registered in the feature amount file 361. Then the similarity degree of the taken image of the commodity is calculated as in having a similarity degree of 0.65 for commodity #1, having a similarity degree of 0.2 for commodity #2, having a similarity degree of 0.1 for commodity #3, and having a similarity degree of 0.05 for commodity #4, for example.

The similarity degree determination unit 93 determines, for each frame image acquired by the image acquisition unit 90, a similarity degree of an image of the commodity with a commodity image recorded in the feature amount file 361. In the present embodiment, a plurality of conditions is provided for a similarity degree between a commodity image of a carried commodity and a taken image of a commodity. The similarity degree determination unit 93 makes a selection between to finalize a carried commodity and to perform navigation (guidance) for commodity recognition based on the condition satisfied. The conditions relating to a similarity degree are not limited especially, and the following describes the case using conditions M and N.

Herein, condition M is a condition to finalize the object on a frame image as one of the carried commodities recorded in the feature amount file 361. Meanwhile condition N is a condition to extract a plurality of candidates of the carried commodities recorded in the feature amount file 361 based on the object on the frame image.

For instance, the similarity degree determination unit 93 determines that a carried commodity satisfying condition M is a commodity having a one-to-one correspondence with the object on the frame image. Then the similarity degree determination unit 93 determines that a carried commodity satisfying condition N is one of a plurality of candidates for the commodity imaged by the camera 27. Then, the similarity degree determination unit 93 extracts a carried commodity satisfying condition N from the plurality of carried commodities recorded in the feature amount file 361 to extract the carried commodities as the candidates for the imaged commodity.

Conditions M and N are not limited especially about their details as long as they are set in a stepwise manner in accordance with similarity degrees, and conditions M, N may be set with a preset plurality of thresholds in one example. The following describes the case where conditions M, N are set with threshold T and a predetermined value D.

The similarity degree determination unit 93 determines that, when the similarity degree of the commodity having a highest similarity degree among the carried commodities is threshold T or more and a difference in similarity degree between the commodity having the highest similarity degree and the commodity having the second highest similarity degree is the predetermined value D or more, then condition M is satisfied. Condition M is a condition to specify the commodity uniquely.

Further the similarity degree determination unit 93 determines that, when the similarity degree of the commodity having a highest similarity degree among the carried commodities is threshold T or more and a difference in similarity degree between the commodity having the highest similarity degree and the commodity having the second highest similarity degree is less than the predetermined value D, then condition N is satisfied. Condition N is a condition for a plurality of candidate commodities. Then it is determined for a carried commodity satisfying condition N that checking at another face is required while guiding the operator to rotate the commodity.

Herein conditions M and N can be set appropriately, which are not limited to the above example.

The guidance unit 94 makes the display 221 display information to guide the operator to rotate the commodity for a carried commodity satisfying condition N. Specifically the guidance unit 94 reads a photo image of a candidate commodity satisfying condition N in each direction from the feature amount file 361, and guides the operator so as to rotate the commodity in a direction where a similarity degree with the candidate commodity is expected to be high. When an image of a stuffed toy is taken from the top (above), for example, the guidance unit 94 makes the display 221 display an arrow so as to urge the operator to rotate the stuffed toy until the face of the stuffed toy as a feature thereof can be observed.

For instance, when object recognition of a stuffed rabbit is performed using an image taken by holding it so as to direct its top toward the camera 27, a similarity degree with a reference image of a stuffed rabbit in the feature amount file 361 is not so high to enable finalization of the commodity, and a stuffed rabbit and a stuffed bear are listed as the candidates. Then feature amounts of reference images of the stuffed rabbit and the stuffed bear as the candidate commodities taken from various directions are compared, and a direction having a large difference in the feature amount and having a noticeable difference in appearance is specified. When the front direction is specified, the guidance unit 94 makes the display 221 display an arrow to urge the operator to rotate the commodity from the above to the front.

The guidance unit 94 stores information on the combination of these candidate commodities and information on the feature direction of these candidate commodities in the similar commodity database 362. Thereby, navigation is enabled promptly without performing calculation about the same condition to take an image and the same candidates.

Note here that, even when an arrow to urge the operator to rotate the commodity is displayed on the display 221, image acquisition processing by the image acquisition unit 90, object detection processing by the object detection unit 91 and similarity degree calculation processing by the similarity degree calculation unit 92 are continued.

The finalization notification unit 95 informs the operator and the customer by an image output or sound output that the commodity imaged by the camera 27 is finalized uniquely as the carried commodity satisfying the condition.

Specifically the finalization notification unit 95 makes the display 221 display a finalization screen indicating that the carried commodity satisfying the condition is uniquely finalized for the commodity (finalized commodity) imaged by the camera 27, and outputs information on the finalized commodity to the speaker 28. The speaker 28 outputs the input information to inform the operator and the customer of the information indicating the finalized commodity.

The input acquisition unit 96 receives various input operations corresponding to the displayed contents on the display 221 via the touch panel 222 or the keyboard 23.

The information output unit 97 outputs information indicating the finalized commodity finalized as stated above (e.g., the commodity ID, the commodity name or discount information) to the POS terminal 3 via the interface 25.

The information output unit 97 may output the number of the commodities sold that is input separately via the touch panel 222 or the keyboard 23 as well as the commodity ID or the like to the POS terminal 3. For the information output from the information output unit 97 to the POS terminal 3, the information output unit 97 may notice the commodity ID read from the feature amount file 361 directly or may notice the commodity name by which the commodity ID can be specified or the file name of the commodity image or the photo image to the POS terminal 3.

The sales registration unit 99 of the POS terminal 3 performs sales registration of the corresponding commodity based on the commodity ID and the number of the commodities sold output from the information output unit 97. Specifically the sales registration unit 99 refers to the feature amount file 361 and records the notified commodity ID and the corresponding commodity class, commodity name, unit price and the number of commodities sold in a sales master file or the like for sales registration (temporary registration).

Figure 4:
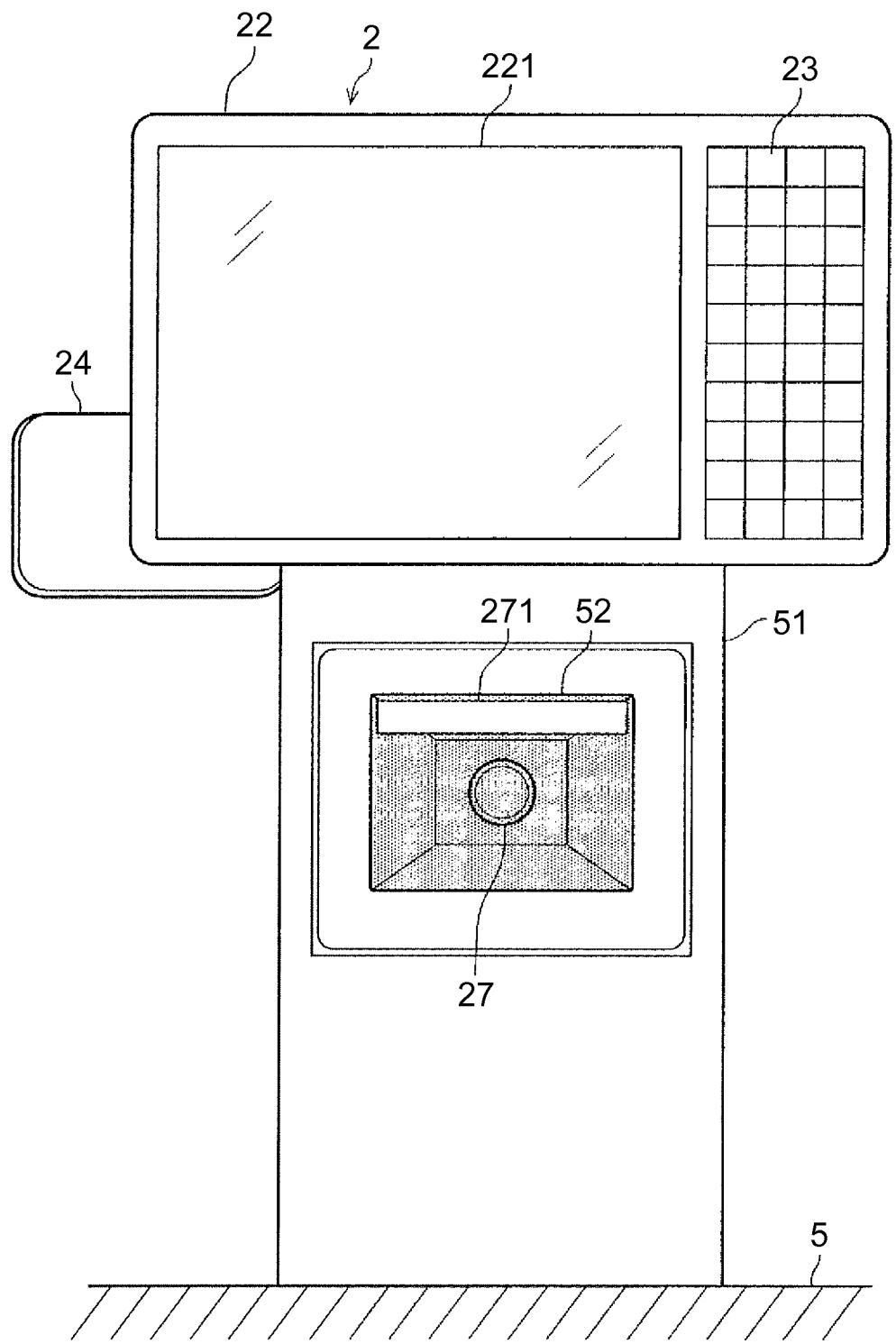
FIG. 4 is a front view of the commodity identification device in one embodiment.

FIG. 4 is a front view of the commodity identification device 2 in one embodiment.

The commodity identification device 2 is provided on the counter base 5. The commodity identification device 2 includes the thin and rectangular-parallelepiped housing 51, the display/manipulation unit 22 attached above the housing 51 and the display for customer 24 provided on the left of and behind the display/manipulation unit 22 while facing the rear face toward the operator.

The housing 51 is provided with the reading window 52 on the front face.

In the reading window 52, a light 271 and the camera 27 (imaging means) are disposed.

This commodity identification device 2 detects an object by the camera 27, identifies the commodity name of the object and makes the POS terminal 3 perform sales registration processing.

Embodiment 1

Referring to FIGS. 5 to 10B, Embodiment 1 is described below.

FIG. 5 illustrates the configuration of a feature amount file 361 in Embodiment 1.

Records in the feature amount file 361 includes a feature amount column 361a, an image link column 361b, a direction column 361c, a commodity ID column 361d, a unit price column 361e, and a commodity name column 361f. The feature amount file 361 stores the combination of reference images of each commodity taken from a plurality of directions and information on the imaging direction.

The feature amount column 361a is a column to store a feature amount vector of a reference image of this commodity. Information to be stored in the feature amount column 361a is acquired through an analysis of an image of the image link column 361b described below.

The image link column 361b is a column to store the link of a reference image of this commodity. The reference image indicated with the link is an image of this commodity taken from any one of six directions.

The direction column 361c indicates vectors indicating the direction to take a reference image of this commodity.

The commodity ID column 361d is a column to store information to identify this commodity.

The unit price column 361e is a column to store the unit price of this commodity.

The commodity name column 361f is a column to store the name of this commodity.

FIGS. 6A to 6F illustrate reference images of a stuffed rabbit from six directions.

Figure 6A:
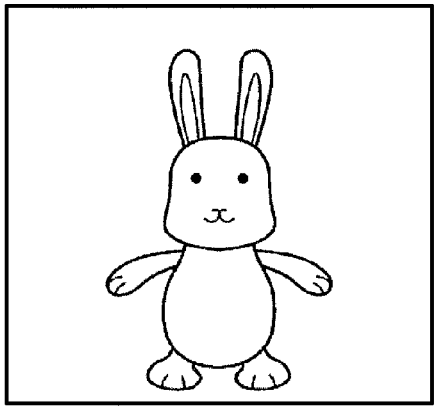
FIGS. 6A to 6F illustrate reference images from six directions in Embodiment 1.

FIG. 6A illustrates a reference image in the front direction of the stuffed rabbit. Herein let that X axis is defined as right from the front, Y axis is defined as above from the front and Z axis is defined as depth from the front, then the vector in the imaging direction is (X,Y,Z)=(0,0,1). In general, the reference image in this front direction is the most suitable direction for object recognition of objects, such as stuffed toys.

Figure 6B:
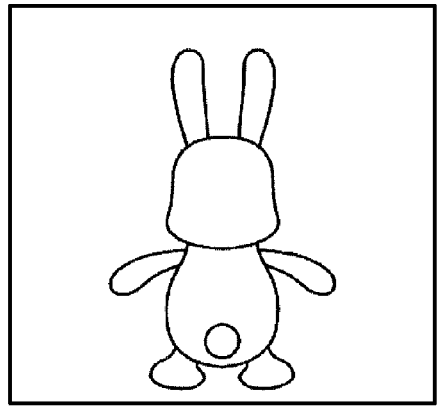

FIG. 6B illustrates a reference image in the back direction of the stuffed rabbit. The vector in the imaging direction is (X,Y,Z)=(0,0,−1).

Figure 6C:
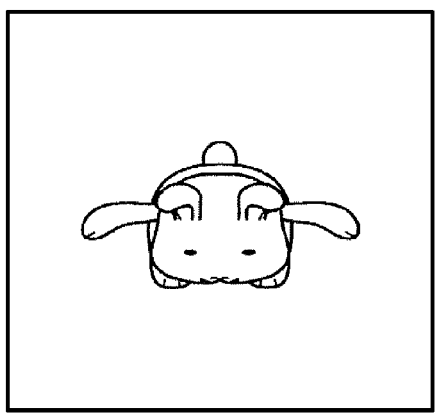

FIG. 6C illustrates a reference image in the above direction of the stuffed rabbit. The vector in the imaging direction is (X,Y,Z)=(0,−1,0).

Figure 6D:
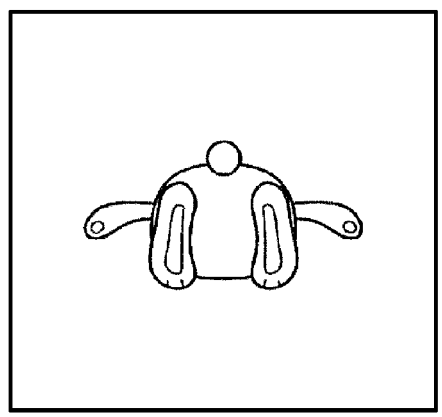

FIG. 6D illustrates a reference image in the below direction of the stuffed rabbit. The vector in the imaging direction is (X,Y,Z)=(0,1,0).

Figure 6E:
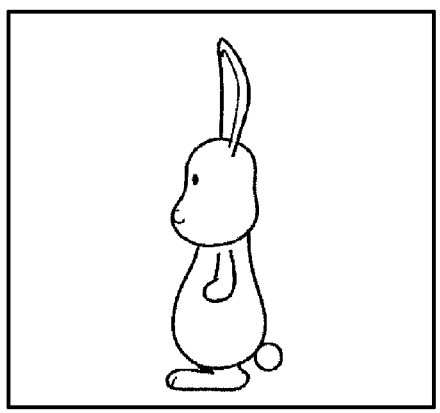

FIG. 6E illustrates a reference image in the right direction of the stuffed rabbit. The vector in the imaging direction is (X,Y,Z)=(−1,0,0).

Figure 6F:
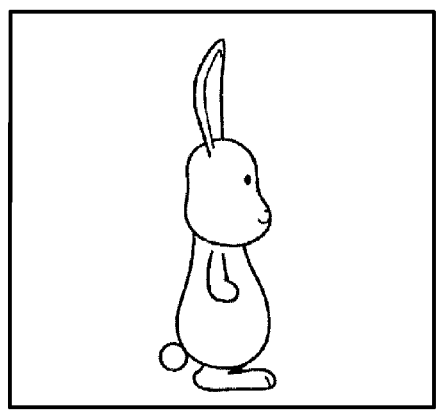

FIG. 6F illustrates a reference image in the left direction of the stuffed rabbit. The vector in the imaging direction is (X,Y,Z)=(1,0,0).

In this way, reference images of the commodity in the six directions are recorded beforehand, whereby this commodity can be recognized easily when a commodity is held in any direction.

FIGS. 7A to 7F illustrate reference images of a stuffed bear from the six directions.

Figure 7A:
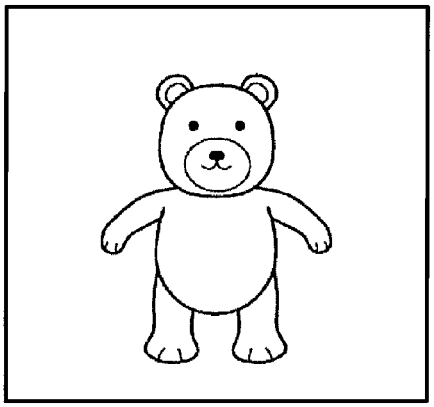
FIGS. 7A to 7F illustrate reference images from six directions in Embodiment 1.

FIG. 7A illustrates a reference image in the front direction of the stuffed bear. The vector in the imaging direction is (X,Y,Z)=(0,0,1), and a difference from the stuffed rabbit in FIG. 6A is the largest. This means that a similarity degree between the stuffed bear and the stuffed rabbit is the smallest in the images in the front direction.

Figure 7B:
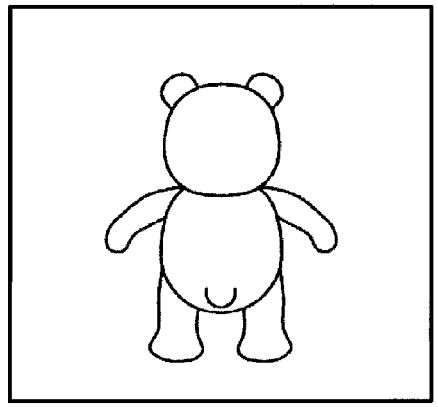

FIG. 7B illustrates a reference image in the back direction of the stuffed bear. The vector in the imaging direction is (X,Y,Z)=(0,0,−1), and a difference from the stuffed rabbit in FIG. 6B is relatively small.

Figure 7C:
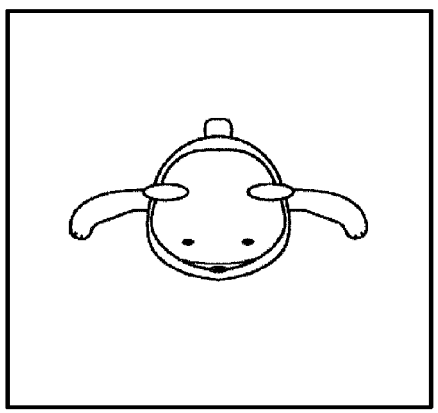

FIG. 7C illustrates a reference image in the above direction of the stuffed bear. The vector in the imaging direction is (X,Y,Z)=(0,−1,0), and a difference from the stuffed rabbit in FIG. 6C is relatively small.

Figure 7D:
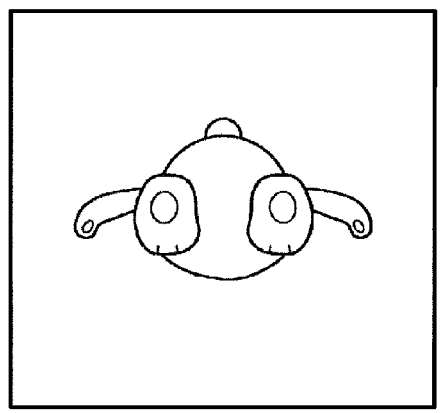

FIG. 7D illustrates a reference image in the below direction of the stuffed bear. The vector in the imaging direction is (X,Y,Z)=(0,1,0), and a difference from the stuffed rabbit in FIG. 6D is relatively small.

Figure 7E:
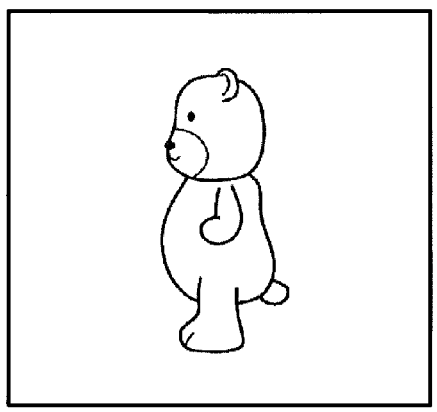

FIG. 7E illustrates a reference image in the right direction of the stuffed bear. The vector in the imaging direction is (X,Y,Z)=(−1,0,0), and a difference from the stuffed rabbit in FIG. 6E is relatively small.

Figure 7F:
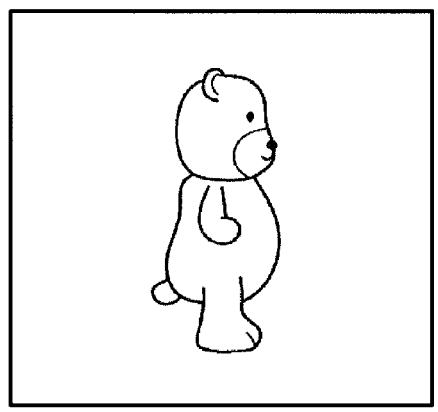

FIG. 7F illustrates a reference image in the left direction of the stuffed bear. The vector in the imaging direction is (X,Y,Z)=(1,0,0), and a difference from the stuffed rabbit in FIG. 6F is relatively small.

FIG. 8 illustrates the configuration of the similar commodity database 362 in Embodiment 1.

The similar commodity database 362 includes a first commodity ID column 362a, a first direction column 362b, a second commodity ID column 362c, a second direction column 362d, a feature image column 362e, a feature direction column 362f, and a rotating axis vector column 362g. The similar commodity database 362 is a result of learning in the past commodity identification, and by referring to this, the calculation of object recognition can be skipped for processing at higher speed.

The first commodity ID column 362a is a column to store one of the commodity ID between two similar candidate commodities, and the second commodity ID column 362c is a column to store the other commodity ID.

The first direction column 362b is a column to store the direction to take an image of a reference image of one of the commodity between two similar candidate commodities, and the second direction column 362d is a column to store the direction to take an image of a reference image of the other commodity.

The feature image column 362e is a column to store the link of the image of the reference images of one of the commodities between two similar candidate commodities, in which the similarity degree of the two candidate commodities is the smallest, and so a difference in feature is noticeable.

The feature direction column 362f is a column to store the direction vector of the reference image of one of the commodities between two similar candidate commodities, in which the similarity degree of the two candidate commodities is the smallest, and so a difference in feature is noticeable.

The rotating axis vector column 362g is a column to store the vector of a rotating axis when the target commodity is directed in the direction having the smallest similarity degree. This vector is converted into a vector on the image taken, whereby an arrow on the screen to guide the rotation can be displayed.

Figure 9:
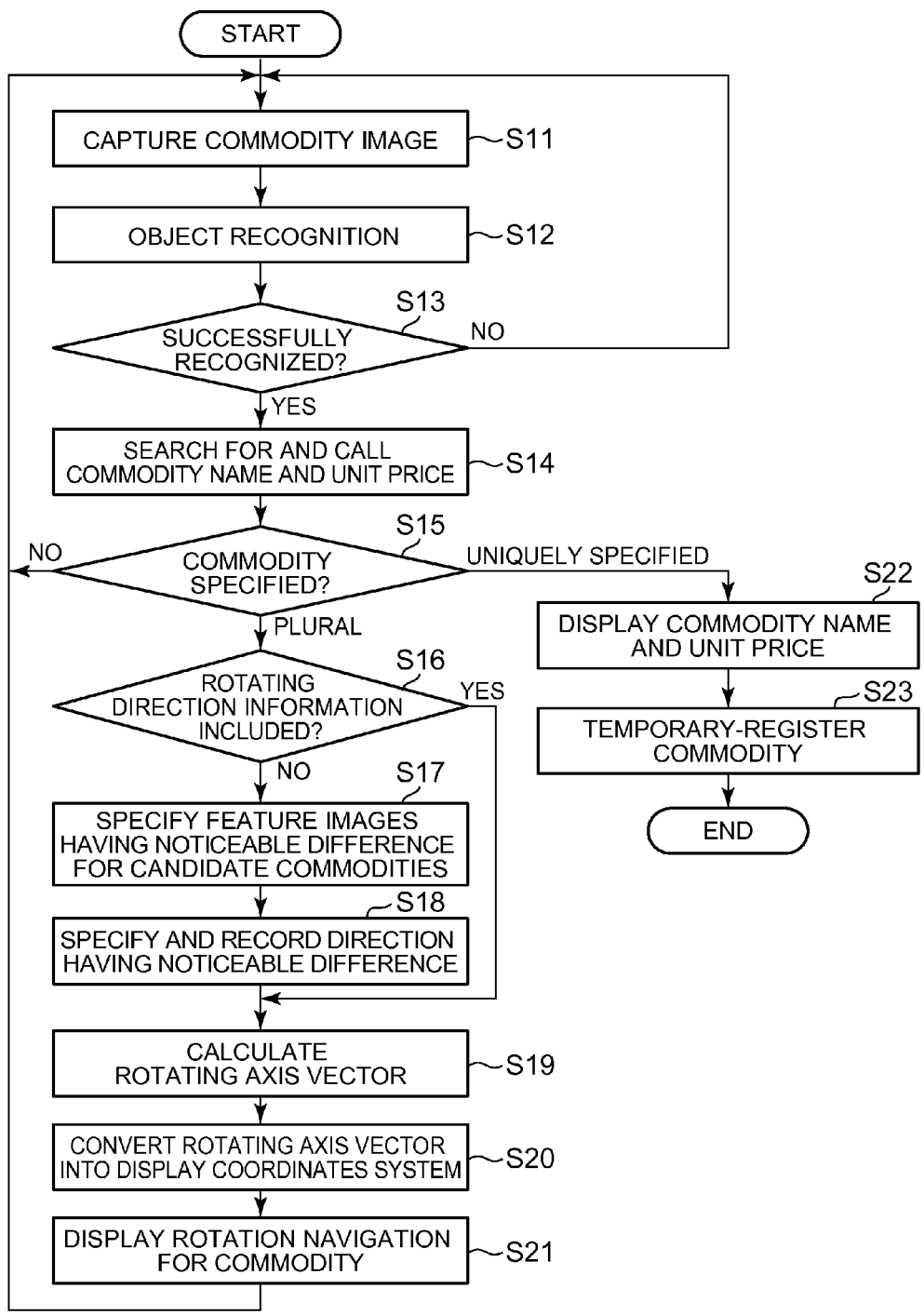
FIG. 9 is a flowchart illustrating the temporary registration processing of a commodity in Embodiment 1.

FIG. 9 is a flowchart illustrating the temporary registration processing of a commodity in Embodiment 1.

The temporary registration processing of a commodity in Embodiment 1 is a series of processing, in which an operator (store staff) picks up a stuffed rabbit as a commodity from the first shopping basket 4L (see FIG. 1), holds it over the camera 27 in the reading window 52, and performs temporary registration of this stuffed rabbit.

At Step S11, the image acquisition unit 90 outputs an imaging ON signal to the camera 27 to let the camera 27 start capturing (taking) of a commodity image. The image acquisition unit 90 acquires frame images (captured image) taken by the camera 27 and stored in the RAM 213.

At Step S12, the object detection unit 91 performs object recognition processing to the frame images acquired by the image acquisition unit 90 to try to recognize (detect) the entire or a part of the object as a commodity.

At Step S13, the object detection unit 91 determines whether recognition of the entire or a part of the object as a commodity is successfully performed or not. When the object detection unit 91 determines that the object as a commodity is successfully recognized (Yes), the procedure proceeds to Step S14, and when it determines that the object as a commodity is not successfully recognized (No), the procedure returns to Step S11. Specifically, Steps S11 to S13 are a series of processing, in which the operator holds the commodity over the camera 27 of the reading window 52, and the commodity identification device 2 successfully detects (recognizes) the object as this commodity.

At Step S14, the similarity degree calculation unit 92 reads a feature amount of the commodity from the entire or a part of the image of the commodity. Further the similarity degree determination unit 93 determines whether there is a carried commodity having a similarity degree of the threshold T or more in the feature amount file 361 or not, and searches for the commodity name and the commodity unit price of this commodity for calling.

At Step S15, based on whether there is a carried commodity having a similarity degree of the threshold T or more in the feature amount file 361 or not, the similarity degree determination unit 93 determines whether the commodity is specified uniquely or not. When the similarity degree determination unit 93 determines that the carried commodity having a similarity degree of the threshold T or more is uniquely specified, the procedure proceeds to Step S22, and when it is determined that there is a plurality of candidate commodities, the procedure proceeds to Step S16. When there are no candidate commodities, the procedure returns to Step S11. Specifically, the similarity degree determination unit 93 determines a stuffed rabbit and a stuffed bear as the candidate commodities. Further the similarity degree determination unit 93 determines that this commodity is the most similar to the stuffed rabbit and then is the second most similar to the stuffed bear as well.

The processing from Step S16 to Step S21 is a series of processing relating to navigation to rotate the commodity. This processing is repeated when there is a plurality of candidate commodities.

At Step S16, the guidance unit 94 determines whether the similar commodity database 362 includes rotating direction information on the candidate commodities or not. That is, the guidance unit 94 searches for the combination of the candidate commodities having the highest and the second highest similarity degrees from the similar commodity database 362, and determines the presence of the rotating direction information on the candidate commodities based on the presence or not of the corresponding record. When the guidance unit 94 determines that the similar commodity database 362 includes rotating direction information on the candidate commodities (Yes), the procedure proceeds to Step S19, and when it is determined that the similar commodity database does not include rotating direction information (No), the procedure proceeds to Step S17.

At Step S17, the guidance unit 94 compares reference images in the same direction for the two candidate commodities, and specifies the reference images between which a difference in feature becomes noticeable. Specifically, the guidance unit compares reference images in the six directions of the stuffed rabbit and the stuffed bear. Herein, these commodities have the smallest similarity degree in their front images, and so a difference in feature is noticeable there.

At Step S18, the guidance unit 94 specifies the imaging direction in which a difference in feature is noticeable, and records the same as well as the combination information on the two candidate commodities in the similar commodity database 362. Thereby, when similar candidate commodities are detected later, guidance can be displayed promptly without calculating their similarity degree.

At Step S19, the guidance unit 94 calculates a rotating axis vector based on the cross product of the imaging direction vector in which a difference in feature is noticeable and the imaging direction vector of the reference images. Further the guidance unit 94 records the calculated rotating axis vector in the similar commodity database 362.

At Step S20, the guidance unit 94 converts the rotating axis vector into the one on a display coordinates system. Thereby, the rotating axis can be specified on the display coordinates system.

At Step S21, the guidance unit 94 displays an arrow on the screen to navigate the rotation of the commodity that is held by the operator. When the processing at Step S21 ends, the procedure returns to Step S11.

The processing from Step S22 to Step S23 is the processing when the commodity is specified uniquely.

At Step S22, the finalization notification unit 95 displays the image of the commodity with the commodity name and the unit price on a window, and outputs information on the finalized commodity to the speaker 28. Thereby, the finalization notification unit 95 informs the operator that the commodity is uniquely specified.

At Step S23, the information output unit 97 outputs information indicating the finalized commodity (e.g., the commodity ID, the commodity name and discount information) to the POS terminal 3 via the interface 25, and the processing in FIG. 9 ends. The POS terminal 3 temporary-registers this commodity, and registers this with a checkout instruction in the commodity master file.

Figure 10A:
FIGS. 10A and 10B illustrate screens illustrating the exemplary operation in Embodiment 1.
Figure 10B:
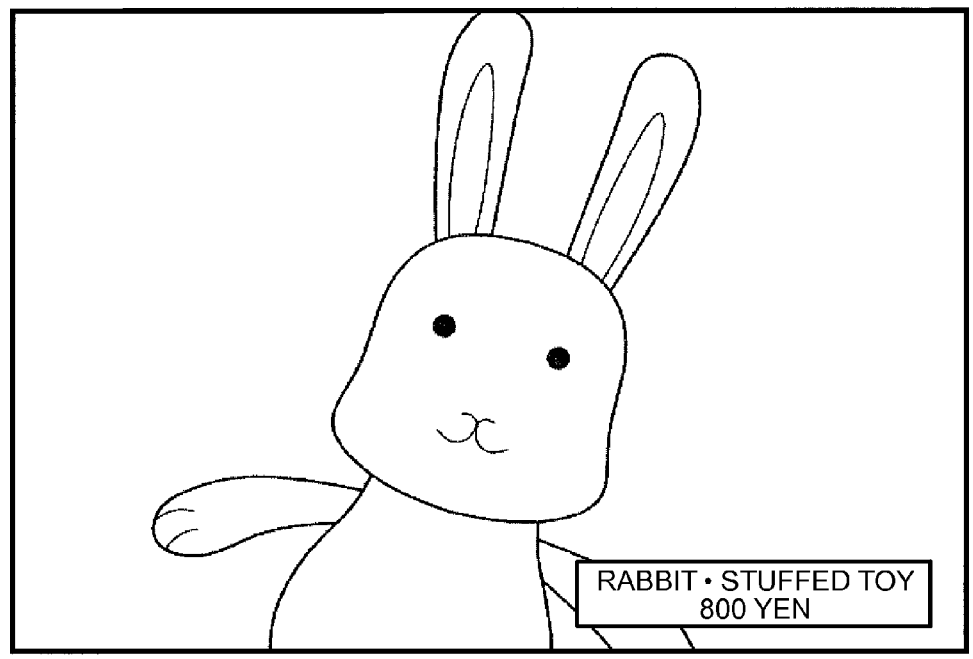

FIG. 10A and FIG. 10B are examples of screens illustrating the exemplary operation in Embodiment 1.

FIG. 10A is a display example on the display 221 when the top of a stuffed rabbit is directed toward the camera 27.

The display 221 displays arrows to guide the rotation of this stuffed toy together with the stuffed rabbit. These arrows are to guide the operator to rotate the stuffed rabbit in the direction of the arrows. At this time, the similarity degree determination unit 93 determines that the stuffed rabbit and the stuffed bear are candidate commodities.

Then the operator rotates the stuffed rabbit in the direction of the arrows. Thereby, the face of the stuffed rabbit is directed toward the camera 27.

FIG. 10B is a display example on the display 221 when the front of the stuffed rabbit is directed toward the camera 27.

The display 221 displays a window "rabbit, stuffed toy, 800 yen" with the stuffed rabbit. This window is to inform the operator that the commodity is uniquely identified.

Embodiment 2

FIG. 11 illustrates the configuration of a similar commodity database 362A in Embodiment 2. The same reference numerals are assigned to the same elements as those in the similar commodity database 362 in Embodiment 1.

Unlike the similar commodity database 362 in Embodiment 1, the similar commodity database 362A does not include the feature direction column 362f and the rotating axis vector column 362g, but includes the other columns.

Figure 12:
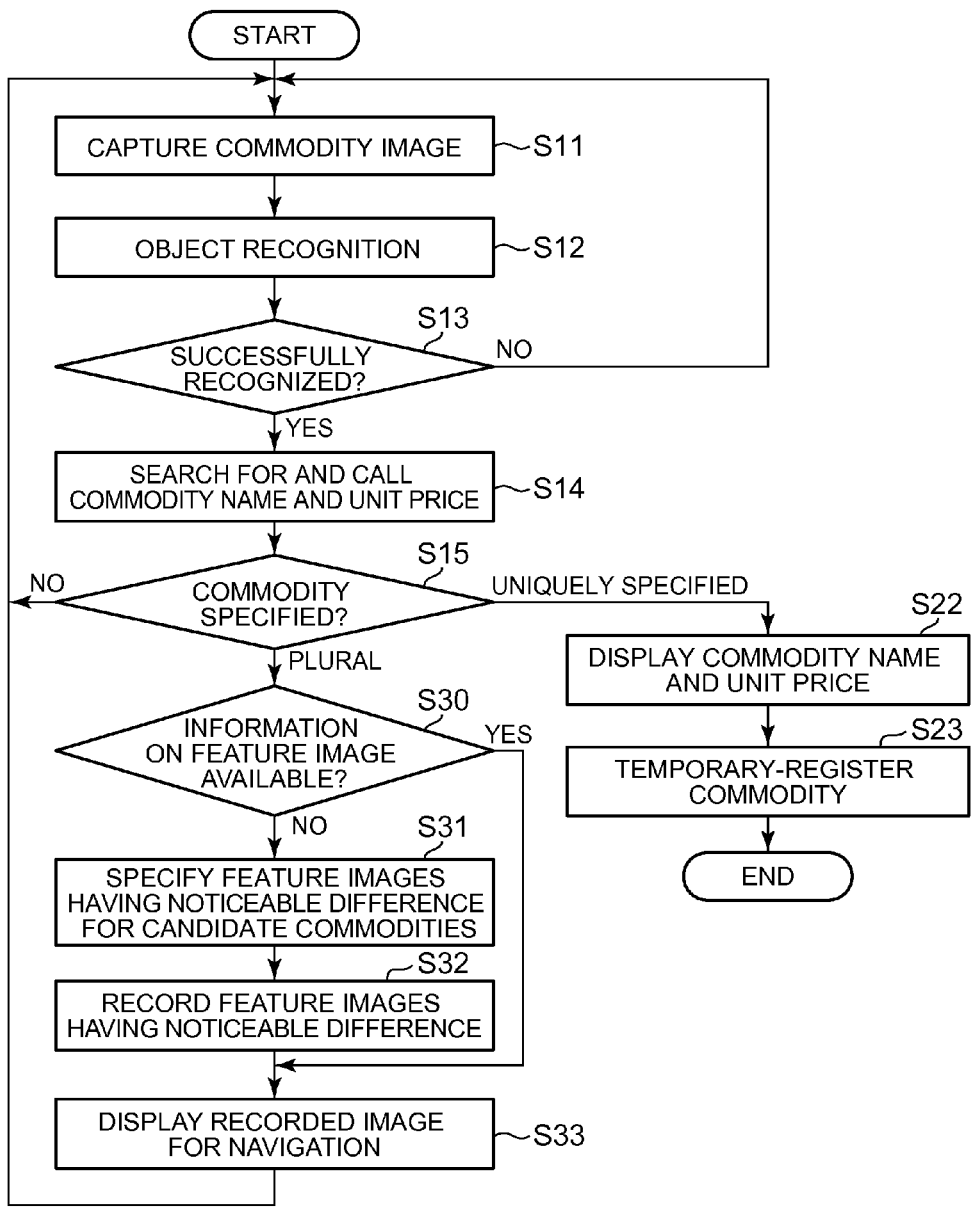
FIG. 12 is a flowchart illustrating the temporary registration processing of a commodity in Embodiment 2.

FIG. 12 is a flowchart illustrating the temporary registration processing of a commodity in Embodiment 2. The same reference numerals are assigned to the same elements as those in the flowchart of the temporary registration processing in Embodiment 1 of FIG. 9.

The temporary registration processing of a commodity in Embodiment 2 is a series of processing, in which an operator (store staff) picks up a stuffed bear as a commodity from the first shopping basket 4L (see FIG. 1), holds it over the camera 27 in the reading window 52, and performs temporary registration of this stuffed bear.

The processing from Step S11 to Step S16 is the same as in that of the processing in Embodiment 1. Specifically the similarity degree determination unit 93 determines that there are a stuffed rabbit and stuffed bear as candidate commodities. Further the similarity degree determination unit 93 determines that this commodity is the most similar to the stuffed bear and then is the second most similar to the stuffed rabbit as well.

At Step S30, the guidance unit 94 determines whether there is information on reference images having a noticeable difference in feature of the candidate commodities or not in the similar commodity database 362A. When the guidance unit 94 determines that there is such information (Yes), the procedure proceeds to Step S33, and when it determines that there is no such information (No), the procedure proceeds to Step S31.

At Step S31, the guidance unit 94 compares reference images in the same direction for the two candidate commodities, and specifies the reference images between which a difference in feature becomes noticeable. Specifically, the guidance unit compares reference images in the six directions of the stuffed bear and the stuffed rabbit. Herein, these commodities are different noticeably in their front images, and so have the smallest similarity degree there.

At Step S32, the guidance unit 94 records the reference image having a noticeable difference in feature of the commodities as well as the combination information on the two candidate commodities in the similar commodity database 362A. Thereby, when similar candidate commodities are detected later, guidance can be displayed promptly without calculating their similarity degree.

At Step S33, the guidance unit 94 displays the reference image having a noticeable difference in feature of the commodities, so as to navigate to rotate the commodity that is held by the operator. When the processing at Step S33 ends, the procedure returns to Step S11.

Through such an operation, the guidance unit 94 can navigate so that the operator is allowed to hold the commodity in the direction where a difference in feature is noticeable.

Figure 13A:
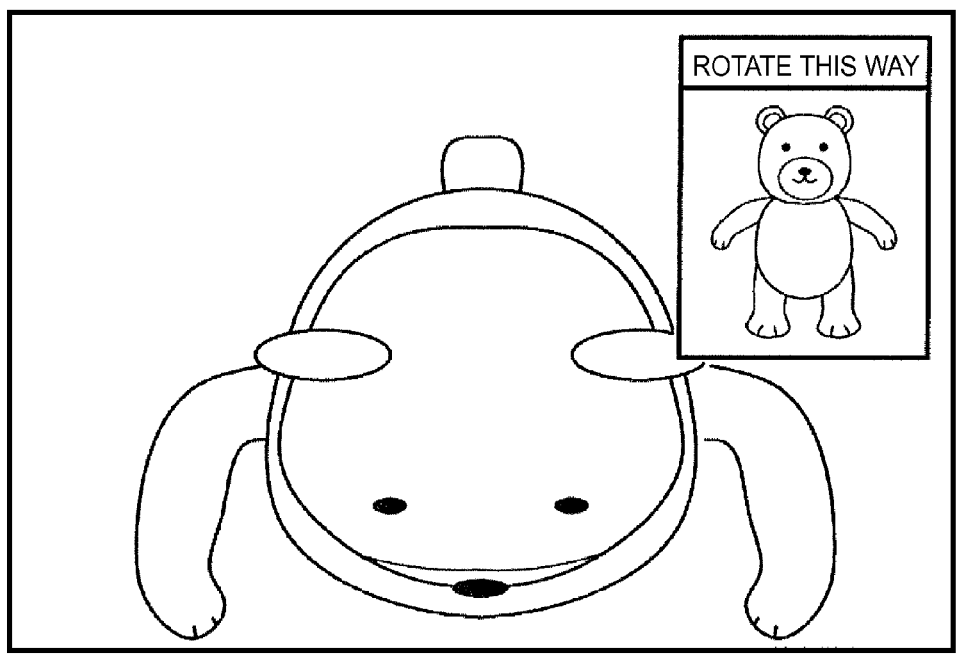
FIGS. 13A and 13B illustrate screens showing the exemplary operation in Embodiment 2.
Figure 13B:
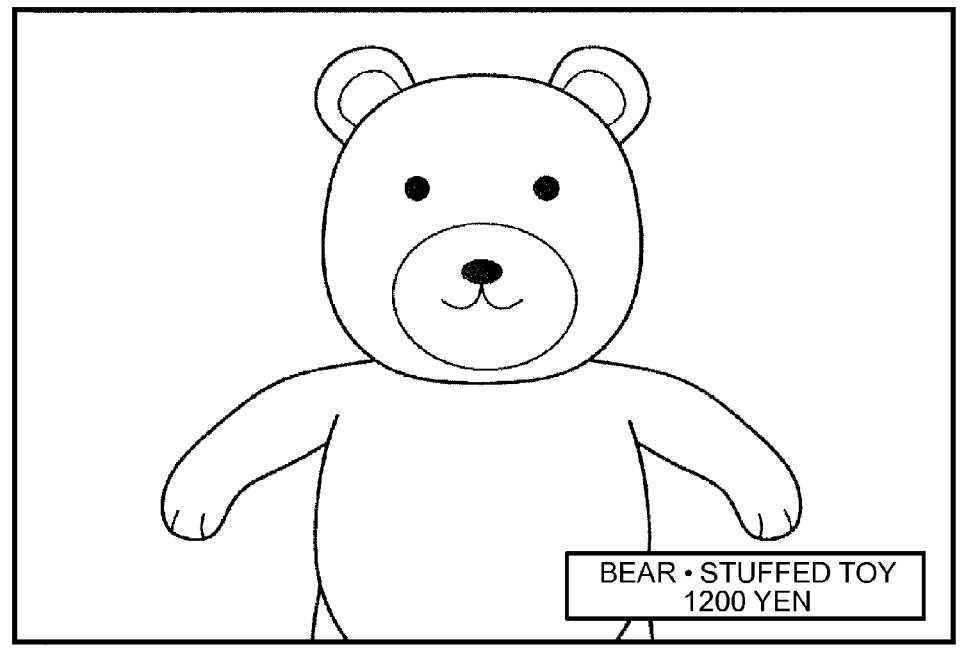

FIGS. 13A and 13B are examples of screens illustrating the exemplary operation in Embodiment 2.

FIG. 13A is a display example on the display 221 when the top of the stuffed bear is directed toward the camera 27.

At this time, the display 221 displays the stuffed bear on the entire screen, as well as the reference image of this stuffed toy in the front direction and a guidance "rotating this way". This guidance guides the operator to direct the front of the stuffed bear toward the camera 27.

Then the operator rotates the stuffed bear. Thereby, the face of the stuffed bear is directed toward the camera 27. Thereby, the commodity identification device 2 can identify this commodity as the stuffed bear.

FIG. 13B is a display example on the display 221 when the front of the stuffed bear is directed toward the camera 27.

At this time, the display 221 displays a window "bear, stuffed toy, 1200 yen" with the stuffed bear. This window is to inform the operator that the commodity is uniquely identified.

The present invention is not limited to these embodiments, and can be modified without deviating from the scope of the invention and may include the following (a) to (d), for example.

(a) the imaging direction of a reference image of a commodity is not limited to the six directions;

(b) navigation to rotate a commodity is not limited to the above embodiments. For instance navigation to rotate a commodity is performed by sound or rotating animation of a polygon;

(c) the number of candidate commodities is not limited to two, and the direction having a noticeable feature (difference) may be determined from three or more candidate commodities; and (d) comparison between reference images of candidate commodities is not limited to the comparison in the directions defined for the imaging. Instead, comparison may be made in a relative direction from the directions of two reference images having a high similarity degree.

Embodiment 3

Referring to FIG. 14 to FIG. 16C, the following describes the summary of major information used in Embodiment 3. FIG. 14 illustrates the configuration of a feature amount file 361 used in Embodiment 3. FIGS. 15A to 15C illustrate an example of a reference image, an image for extraction, and an auxiliary image of a stuffed rabbit.

Figure 16A:
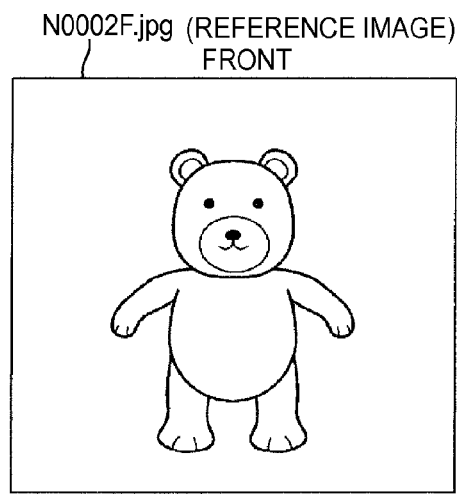
FIGS. 16A to 16C illustrate an example of a reference image, an image for extraction, and an auxiliary image in Embodiment 3.
Figure 16B:
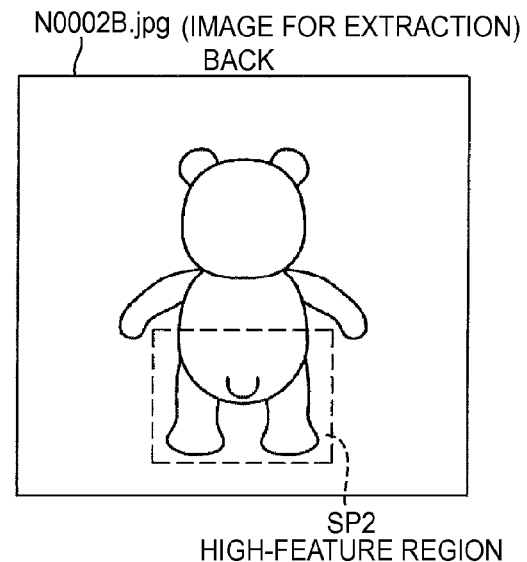
Figure 16C:
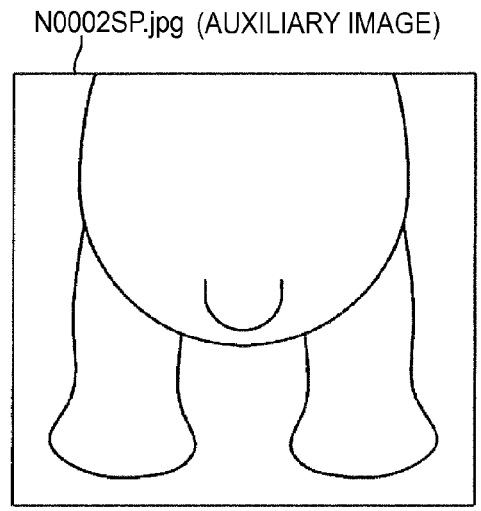

FIGS. 16A to 16C illustrate an example of a reference image, an image for extraction, and an auxiliary image of a stuffed bear. The following assumes the case where a commodity that a customer wants to purchase (commodity as a target of transaction) is a "stuffed rabbit", and the commodity identification device 2 performs object recognition of the "stuffed rabbit", and as a result, a "stuffed rabbit" and a "stuffed bear" are extracted as candidates of the commodity as a target of the transaction. In the present embodiment, the "stuffed rabbit" and the "stuffed bear" are different in their tail shapes, and so their tail parts are a high-feature region.

As illustrated in FIG. 14, the feature amount file 361 includes a feature amount column 361a, an image link column 361b, a class column 361c, a commodity ID column 361d, a unit price column 361e, a commodity name column 361f and a reference for guidance column 361g as records. This feature amount file 361 stores the combination of images, such as a reference image of each commodity used for object recognition, an image for extraction to extract a high-feature region, and an auxiliary image including the high-feature region, and a feature amount of each image.

A feature amount column 361a is a column to store a feature amount of an image corresponding to this commodity. Information to be stored in the feature amount column 361a is acquired through an analysis of an image of the image link column 361b described below.

The image link column 361b is a column to store link information of the image corresponding to this commodity. For instance, in the example of FIG. 14, for the carried commodity having the commodity ID of "N0001", link information is stored, associating a reference image (N0001F.jpg), an image for extraction (N0001B.jpg) and an auxiliary image (N0001SP.jpg). For the letters at the end of the code indicating each image, "F" denotes a front image of the carried commodity, "B" denotes a back image of the carried commodity, and "SP" denotes an enlarged image of a high-feature region of the carried commodity.

The following assumes the case where the front image of the carried commodity is a reference image. For some carried commodities, however, images in other directions may be their reference images. The following assumes the case where the high-feature region of the carried commodity is included in the back image of the carried commodity. For some carried commodities, however, their high-feature regions may be included in images in other directions (e.g., a front image). If a high-feature region of a carried commodity is included in the front image, then the front image will be an image for extraction, and so link information on the front image will be registered in the image link column 361b for the image for extraction.

In the present embodiment, the "auxiliary image" that is linked with the commodity ID of each carried commodity by link information is used as "auxiliary information". Herein, the feature amount file 361 may include message information, such as "direct a tail of the stuffed toy toward the camera", as the "auxiliary information" so as to correspond to the commodity ID of each carried commodity, for example.

The class column 361c is a column to store class information on the image (hereinafter called "link image") linked in the image link column 361b. For instance, in the example of FIG. 14, the class column 361c stores three types of class information, including "reference" indicating that the link image is a reference image, "for extraction" indicating that the link image is an image for extraction, and "auxiliary" indicating that the link image is an auxiliary image.

The commodity ID column 361d is a column to store information to identify this commodity.

The unit price column 361e is a column to store the unit price of this commodity.

The commodity name column 361f is a column to store the name of this commodity.

The reference for guidance column 361g stores reference information to designate an image (hereinafter called "reference image") to be referred to when the guidance unit 94 creates a guidance image GP (see FIG. 18B). For instance, in the example of FIG. 14, the reference for guidance column 361g of the carried commodity having the commodity ID of "N0001" stores reference information to designate an image for extraction (N0001B.jpg) for the reference image (N0001F.jpg), and reference information to designate an auxiliary image (N0001SP.jpg) for the image for extraction (N0001B.jpg). Such reference information is information indicating which part of the carried commodity the auxiliary image shows.

Figure 15A:
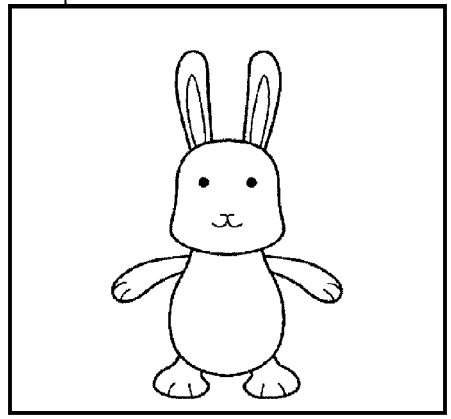
FIGS. 15A to 15C illustrate an example of a reference image, an image for extraction, and an auxiliary image in Embodiment 3.
Figure 15B:
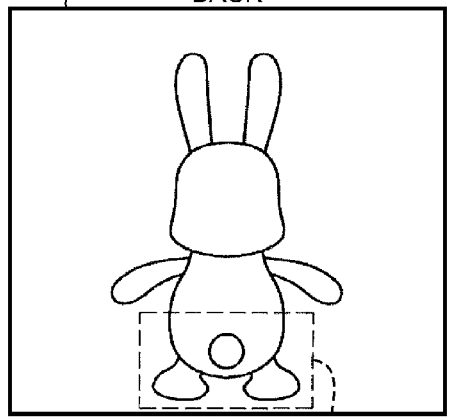
Figure 15C:
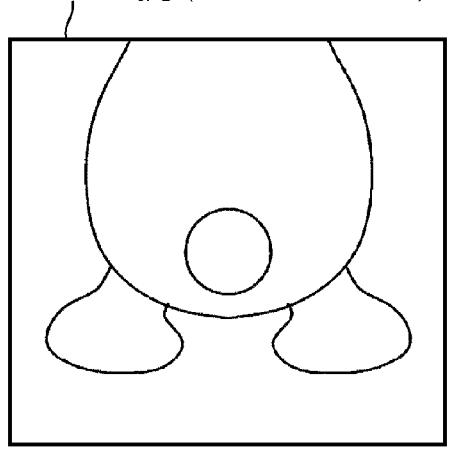

FIG. 15A illustrates a reference image (N0001F.jpg) of a "stuffed rabbit" in the front direction, FIG. 15B illustrates an image for extraction (N0001B.jpg) of the "stuffed rabbit", and FIG. 15C illustrates an auxiliary image (N0001SP.jpg) of the "stuffed rabbit". The auxiliary image (N0001SP.jpg) in FIG. 15C is a taken image of the high-feature region SP1 included in the image for extraction (N0001B.jpg) in FIG. 15B.

FIG. 16A illustrates a reference image (N0002F.jpg) of a "stuffed bear" in the front direction, FIG. 16B illustrates an image for extraction (N0002B.jpg) of the "stuffed bear", and FIG. 16C illustrates an auxiliary image (N0002SP.jpg) of the "stuffed bear". The auxiliary image (N0002SP.jpg) in FIG. 16C is a taken image of the high-feature region SP2 included in the image for extraction (N0002B.jpg) in FIG. 16B.

In general, the reference image in the front direction is the most suitable direction for object recognition of objects, such as stuffed toys. When the commodity identification device 2 performs object recognition of the object appearing in the captured image (in this case, the "stuffed rabbit" that the customer wants to purchase), a commodity is searched for based on the reference image designated by the link information in the image link column 361b of the feature amount file 361 to perform narrowing-down for a target commodity.

For this narrowing-down, when the candidates of a target commodity are narrowed down to one commodity although its similarity degree with the object is a threshold or less, the commodity identification device 2 tries to narrow down (finalize) the candidates of a target commodity uniquely based on the auxiliary image of the narrowed-down one candidate. Alternatively, for this narrowing-down, when the candidates of a target commodity are narrowed down to some carried commodities having a similarity degree with the object exceeding the threshold, the commodity identification device 2 tries to narrow down (finalize) the target commodity uniquely based on the auxiliary image of the candidate having the highest similarity degree with the object. Thereby the commodity identification device 2 can improve the precision to narrow down the candidates of a target commodity.

In the present embodiment, when the commodity identification device 2 of the commodity registration device 1 performs object recognition of an object (commodity) based on reference images, and when candidates for the target commodity are narrowed down under a predetermined condition (e.g., when the candidates of a commodity are narrowed down to one although its similarity degree with the object is a threshold or less), the commodity identification device 2 tries to narrow down the candidates of a target commodity uniquely by object recognition based on the auxiliary image. At this time, the commodity identification device 2 guides the operator to direct the high-feature region of the object toward the camera 27 based on the auxiliary information.

Figure 17:
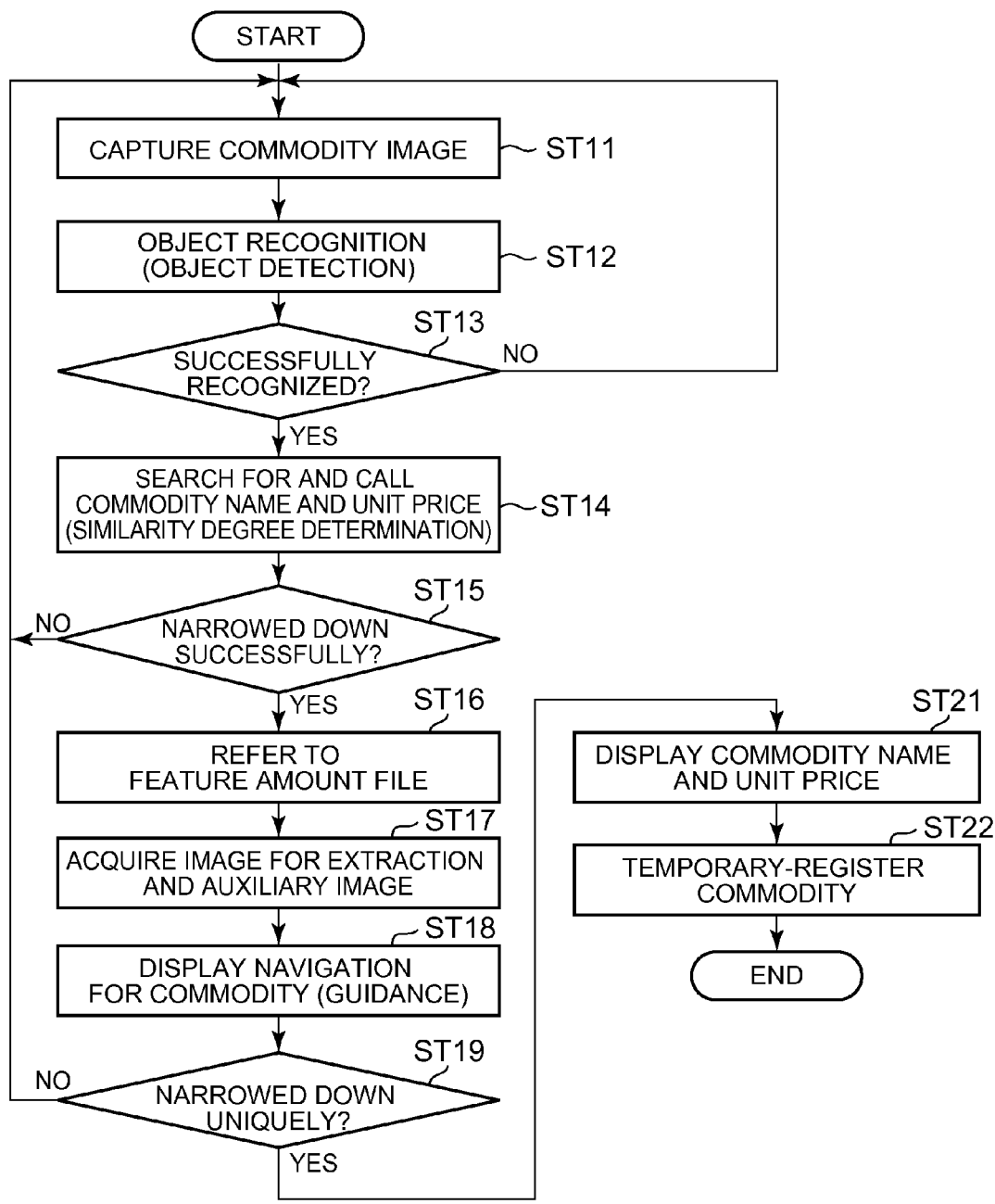
FIG. 17 is a flowchart illustrating the operation of the commodity registration device including the commodity identification device according to Embodiment 3.
Figure 18A:
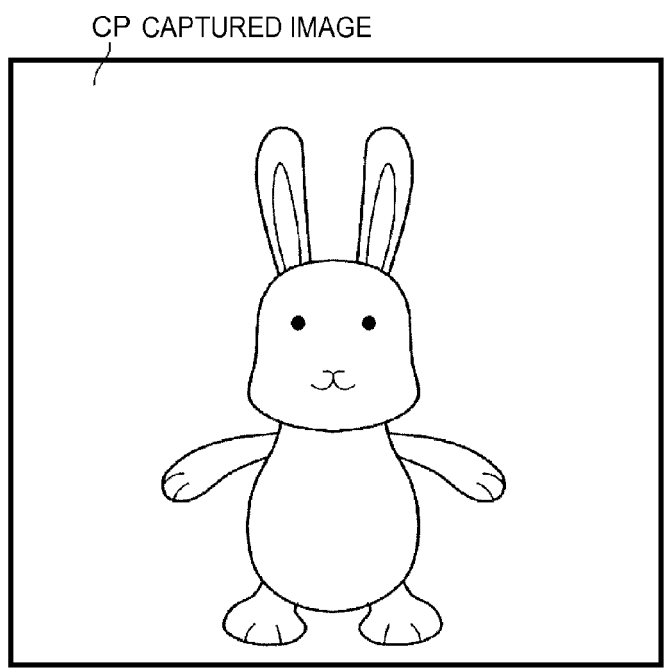
FIGS. 18A and 18B illustrates one example of the display screen in Embodiment 3.
Figure 18B:
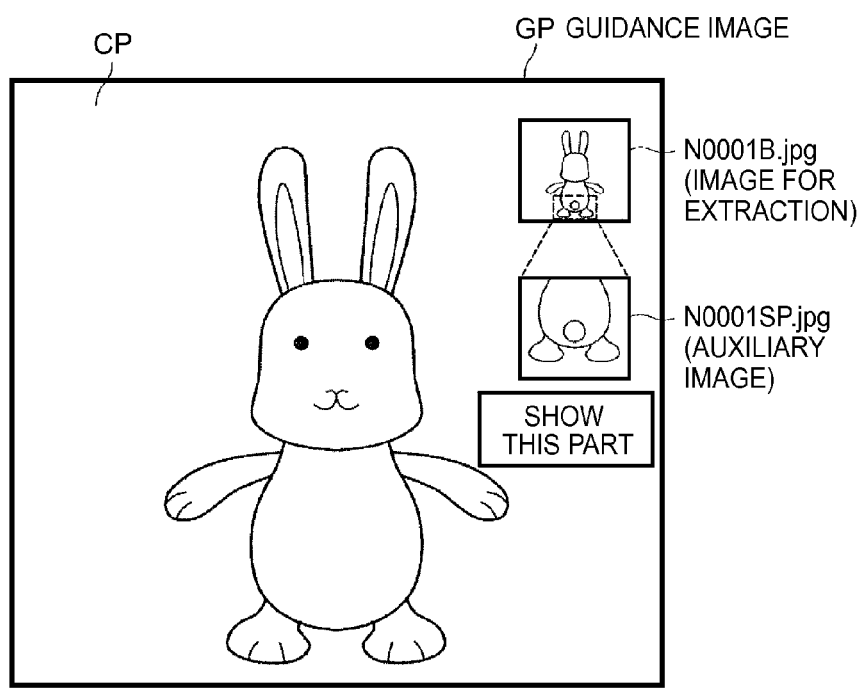

Referring to FIG. 17 and FIGS. 18A and 18B, the following describes the operation of the commodity registration device 1. FIG. 17 is a flowchart illustrating the operation of the commodity registration device 1. FIGS. 18A and 18B illustrate one example of the display screen that is displayed on the display 221 (see FIG. 1) of the commodity identification device 2 for explanation.

When the operator instructs to start the commodity registration processing, the commodity registration device 1 starts the operation. The commodity temporary-registration processing of one embodiment is, for example, a series of the processing, in which the operator (store staff) picks up a stuffed rabbit as an object (commodity) from the first shopping basket 4L (see FIG. 1), holds it over the camera 27 in the reading window 52, performs temporary registration of this stuffed rabbit as a target commodity of the transaction, and puts it into the second shopping basket 4R.

As illustrated in FIG. 17, at Step ST11, the image acquisition unit 90 outputs an imaging ON signal to the camera 27 to let the camera 27 start capturing (taking) of a frame image (captured image) of the commodity. The image acquisition unit 90 acquires frame images (captured image) taken by the camera 27 and stored in the RAM 213.

The commodity identification device 2 of the commodity registration device 1 displays frame images (captured image) acquired in the image acquisition unit 90 on the display 221 (see FIG. 1). The following assumes the case where the commodity identification device 2 displays a captured image CP (see FIG. 18A) on the display 221.

At Step ST12, the object detection unit 91 performs object recognition processing to the frame image acquired by the image acquisition unit 90, and tries to recognize (detect) the entire or a part of the object as the commodity. Thereby the object detection unit 91 performs object detection processing.

Step ST13, the object detection unit 91 determines whether recognition of the entire or a part of the object as the commodity is successfully performed or not. When the object detection unit determines that the object as the commodity is successfully recognized (Yes), the procedure proceeds to Step ST14, and when it determines that the object as the commodity is not successfully recognized (No), the procedure returns to Step ST11.

Specifically, Steps ST11 to ST13 are a series of processing, in which the operator holds the commodity over the camera 27 of the reading window 52, and the commodity identification device 2 successfully detects (recognizes) the object as this commodity.

At Step ST14, the similarity degree calculation unit 92 reads a feature amount of the commodity from the entire or a part of the image of the commodity. Further a similarity degree determination unit 93 determines whether there is a carried commodity having a similarity degree with the object exceeding a threshold SM or more in the feature amount file 361 or not. Further the similarity degree determination unit 93 determines whether there is a carried commodity having a similarity degree with the object that is the threshold SM or less but exceeds a threshold SN in the feature amount file 361 or not. When there is such one or a plurality of carried commodities, the similarity degree determination unit 93 considers each of the carried commodities as a candidate for the target commodity, and searches for the commodity information on the candidate, such as the commodity ID, the commodity name, and the commodity unit prices for calling. Then the similarity degree determination unit 93 performs narrowing-down processing to try to narrow down the candidates of the target commodity.

At Step ST15, the similarity degree determination unit 93 determines whether the candidates can be narrowed down or not. When it is determined at Step ST15 that the candidates can be narrowed down (Yes), the procedure proceeds to Step ST16, and when it is determined that the candidates cannot be narrowed down (No), the procedure returns to Step ST11.

Herein, "the candidates can be narrowed down (Yes)" means both of the cases where some carried commodities having a similarity degree with the object exceeding the threshold SM can be extracted, and the case where some carried commodities having a similarity degree with the object that is the threshold SM or less but exceeds the threshold SN can be extracted.

Then, "the candidates cannot be narrowed down (No)" means the case where carried commodities having a similarity degree with the object that is the threshold SN or less only can be extracted.

When it is determined at Step ST15 that the candidates cannot be narrowed down (No), at Step ST16, the guidance unit 94 refers to the reference for guidance column 361g (see FIG. 14) in the feature amount file 361 corresponding to the carried commodity having the highest similarity degree with the object appearing in the captured image CP among the candidates of the target commodity extracted by the similarity degree determination unit 93 (in this case, the "stuffed rabbit" having the commodity ID of "N0001").

Next at Step ST17, the guidance unit 94 acquires the image for extraction (N0001B.jpg (see FIG. 15B)) and the auxiliary image (N0001SP.jpg (see FIG. 15C)) of such a carried commodity.

Then at Step ST18, the guidance unit 94 creates a guidance image GP (see FIG. 18B) by synthesizing the acquired image for extraction (N0001B.jpg) and auxiliary image (N0001SP.jpg) with the frame image (captured image) CP in order to improve the precision to narrow down the candidates for the target commodity, and displays the created guidance image GP on the display 221 for navigation of the commodity. Thereby, the guidance unit 94 performs guidance processing to the operator.

At this time, the guidance unit 94 may perform such guidance processing by displaying text message information, such as "direct a tail of the stuffed toy toward the camera" as the navigation of the commodity on the display 221 or by outputting sound corresponding to the message information from the speaker 28 (see FIG. 2).

The operator then performs the operation to direct the high-feature region of the object toward the camera 27 while changing the orientation of the object or moving the object in accordance with the navigation of the commodity (e.g., display of the guidance image GP). Thereby, the commodity registration device 1 acquires a frame image (captured image) showing the high-feature region of the object. Then the similarity degree determination unit 93 compares the object detected by the object detection unit 91 with the auxiliary image of the carried commodity having the highest similarity degree and determines the similarity degree, so as to try to narrow down the candidates of the target commodity uniquely.

Next, at Step ST19, the similarity degree determination unit 93 determines whether the similarity degree with the object exceeds a predetermined threshold or not in the determination of a similarity degree based on the auxiliary image, thereby determining whether the candidates of the target commodity can be narrowed down uniquely or not.

When it is determined at Step ST19 that the candidates of the target commodity cannot be narrowed down uniquely (No), the procedure returns to Step ST11. On the contrary, when the candidates of the target commodity can be narrowed down uniquely at Step ST19 (Yes), the procedure proceeds to Step ST21. In this case, at Step ST21, the finalization notification unit 95 sets the candidate of the target commodity that is narrowed down uniquely as the finalized commodity, displays an image of the finalized commodity as well as its commodity name and the unit price on a window, and outputs information on the finalized commodity to the speaker 28. Thereby, the finalization notification unit 95 informs the operator that the candidates of the target commodity can be narrowed down uniquely (i.e., that the commodity can be finalized).

At Step ST22, the information output unit 97 outputs information indicating the finalized commodity (e.g., the commodity ID, the commodity name and discount information) to the POS terminal 3 via the interface 25, and the processing in FIG. 17 ends. The POS terminal 3 temporary-registers this commodity, and registers this with a checkout instruction in the commodity master file.

In such a configuration, when the commodity identification device 2 performs object recognition of an object (commodity) based on reference images, and when candidates for the target commodity can be narrowed down under a predetermined condition (e.g., when the candidates for the target commodity are narrowed down to one although its similarity degree with the object is a threshold or less, or when the candidates for the target commodity can be narrowed down to a small number of candidates having a similarity degree with the object exceeding a threshold), the commodity identification device 2 guides the operator to direct the high-feature region of the object toward the camera 27 based on the auxiliary information. Thereby, the commodity identification device 2 acquires a captured image including the high-feature region, and tries to narrow down the candidates for the target commodity uniquely based on the similarity degree between the acquired captured image and the auxiliary image. As a result, the commodity identification device 2 can improve the precision to narrow down (precision to specify) the candidates for the target commodity.

Note here that the feature amount file 361, the extraction image, the auxiliary image or the like can be changed as needed in accordance with a carried commodity or in accordance with the operation. For instance, the number of the auxiliary image may be plural, instead of only one. The auxiliary image may be an image of one or a plurality of parts in any of the parts such as the top, the bottom, the right, the left and the back of a carried commodity.

Further the commodity identification device 2 monitors captured images successively during the operator's operation to hold an object (commodity) over the camera 27, irrespective of a determination result about the similarity degree that may be high or low. Then, when a certain degree of candidates for the target commodity can be estimated, the commodity identification device can display, on the display 221, a guidance image GP indicating how to perform the operation to direct the object (commodity).

As stated above, the commodity identification device 2 according to the present embodiment can improve the precision to narrow down the candidates for the target commodity.

The present invention is not limited to the embodiments as described above, and can be variously changed or modified without deviating from the scope of the invention.

The embodiments described in details above are to understand the gist of the present invention easily. Therefore the present invention is not always limited to the configuration including all of the elements described above. A part of the configuration of one embodiment in the present invention may be replaced with the other configuration. A part of the configuration of one embodiment in the present invention may be deleted.

For instance, when the front image of an object is acquired as a captured image and when the high-feature region (feature part) of the object resides in the front of the object, the commodity identification device 2 may display, on the display 221, a guidance image GP so as to urge the operator to move the object horizontally or bring the object closer to the camera 27 until such a high-feature region is directed toward the camera 27.

The present invention is not limited to a cash register that is operated by a store staff as an operator, and may be applied to a so-called "self-checkout machine" to allow a customer to manipulate the machine like an operator, for example.

What is claimed is:

1. A commodity identification device, comprising:
   an imaging device that takes an image of an object that an operator holds over the imaging device to obtain the image of the object; and
   a processor that is configured to perform functions comprising:
      comparing the image of the object obtained by the imaging device with reference images of commodities of a plurality of commodity types, each of the reference images representing one of a plurality of different imaging directions of a respective one of the commodities, so as to detect a commodity type among the plurality of commodity types corresponding to the object of the taken image;
      when a plurality of commodity types corresponding to the object are detected, comparing reference images corresponding to the detected plurality of commodity types and specifying an imaging direction having a noticeable difference among imaging directions represented by the reference images corresponding to the detected plurality of commodity types; and
      guiding the operator to move the object so that a new image of the object can be taken by the imaging device in the specified imaging direction.

2. The commodity identification device according to claim 1, wherein the guiding guides the operator to move the object by controlling a display to display a rotating direction in which the object is to be rotated.

3. The commodity identification device according to claim 1, wherein the guiding guides the operator to move the object by controlling a display to display an arrow in association with the image of the object, the arrow indicating a moving direction in which the object is to be moved.

4. The commodity identification device according to claim 1, wherein the guiding comprises associating information identifying the specified imaging direction with information identifying a combination of the detected plurality of commodity types, and storing the associated information in a storage of the commodity identification device.

5. The commodity identification device according to claim 1, wherein the processor is further configured to control a display to display a reference image that represents the specified imaging direction and corresponds to one of the detected plurality of commodity types.

6. A commodity recognition navigation method, comprising:
   taking, by a camera, an image of an object that an operator holds over the camera to obtain the image of the object;
   comparing the obtained taken image of the object with reference images of commodities of a plurality of commodity types, each of the reference images representing one of a plurality of different imaging directions of a respective one of the commodities, so as to detect a commodity type among the plurality of commodity types corresponding to the object of the taken image;
   when a plurality of commodity types corresponding to the object are detected, comparing reference images corresponding to the detected plurality of commodity types and specifying an imaging direction having a noticeable difference among imaging directions represented by the reference images corresponding to the detected plurality of commodity types; and guiding the operator to move the object so that a new image of the object can be taken by the camera in the specified imaging direction.

7. The method according to claim 6, wherein the guiding guides the operator to move the object by controlling a display to display a rotating direction in which the object is to be rotated.

8. The method according to claim 6, wherein the guiding guides the operator to move the object by controlling a display to display an arrow in association with the image of the object, the arrow indicating a moving direction in which the object is to be moved.

9. The method according to claim 6, further comprising controlling a display to display a reference image that represents the specified imaging direction and corresponds to one of the detected plurality of commodity types.

10. A commodity identification device, comprising:
an imaging device that takes an image of an object that an operator holds over the imaging device to obtain the image of the object; and a processor that is configured to perform functions comprising:

comparing the image of the object obtained by the imaging device with reference images of commodities of a plurality of commodity types, each of the reference images representing one of a plurality of different imaging directions of a respective one of the commodities, so as to detect a commodity type among the plurality of commodity types corresponding to the object of the taken image;

when a plurality of commodity types corresponding to the object are detected, comparing reference images representing a same imaging direction among reference images corresponding to the detected plurality of commodity types, so as to specify an imaging direction having a noticeable difference among imaging directions represented by the reference images corresponding to the detected plurality of commodity types; and guiding the operator to move the object so that a new image of the object can be taken by the imaging device in the specified imaging direction.

* * * * *